US011038976B2

(12) United States Patent
Liu et al.

(10) Patent No.: US 11,038,976 B2
(45) Date of Patent: Jun. 15, 2021

(54) UTILIZING A RECOMMENDATION SYSTEM APPROACH TO DETERMINE ELECTRONIC COMMUNICATION SEND TIMES

(71) Applicant: Adobe Inc., San Jose, CA (US)

(72) Inventors: Xinyue Liu, Santa Clara, CA (US); Jun He, Fremont, CA (US); Zhenyu Yan, Cupertino, CA (US); Wuyang Dai, San Jose, CA (US); Abhishek Pani, San Francisco, CA (US)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 16/564,768

(22) Filed: Sep. 9, 2019

(65) Prior Publication Data

US 2021/0075875 A1    Mar. 11, 2021

(51) Int. Cl.
*H04L 29/08* (2006.01)
*G06N 3/08* (2006.01)
*G06N 3/04* (2006.01)
*G06F 16/2457* (2019.01)

(52) U.S. Cl.
CPC ........ *H04L 67/26* (2013.01); *G06F 16/24575* (2019.01); *G06N 3/04* (2013.01); *G06N 3/08* (2013.01)

(58) Field of Classification Search
CPC ..... H04L 67/26; G06F 16/24575; G06N 3/04; G06N 3/08
USPC ........................................................ 709/206
See application file for complete search history.

(56) References Cited

U.S. PATENT DOCUMENTS

| 9,589,278 | B1* | 3/2017 | Wang | G06Q 30/0272 |
| 9,691,035 | B1* | 6/2017 | Sandler | G06Q 30/0631 |
| 9,754,266 | B2* | 9/2017 | Zhang | G06Q 30/02 |
| 2015/0019325 | A1* | 1/2015 | Li | G06Q 30/0271 |
| | | | | 705/14.42 |
| 2015/0193548 | A1* | 7/2015 | Nice | G06F 16/25 |
| | | | | 707/748 |
| 2015/0278908 | A1* | 10/2015 | Nice | G06Q 30/0631 |
| | | | | 705/26.7 |
| 2019/0295123 | A1* | 9/2019 | Magnuson-Skeels | |
| | | | | G06Q 30/0246 |

(Continued)

OTHER PUBLICATIONS

Leskovec, Jure; "Recommender Systems: Latent Factor Models," Stanford CS246: Mining Massive Datasets; Jan. 31, 2019; p. 1-58; https://web.stanford.edu/class/cs246/slides/08-recsys2.pdf.

(Continued)

*Primary Examiner* — James E Springer
(74) *Attorney, Agent, or Firm* — Keller Jolley Preece

(57) ABSTRACT

The present disclosure relates to systems, methods, and non-transitory computer readable media for determining send times for distributing digital content to client devices utilizing a recommendation system approach. For example, the disclosed systems can utilize a recommendation system model such as a matrix factorization model, a factorization machine model, and/or a neural network to implement collaborative filtering to generate predicted response rates for particular candidate send times. Based on the predicted response rates indicating likelihoods of receiving responses for particular send times, the disclosed system can generate a distribution schedule to provide electronic communications at one or more of the send times.

20 Claims, 13 Drawing Sheets

(56) References Cited

U.S. PATENT DOCUMENTS

2020/0034884 A1\* 1/2020 Ramanuja .......... G06Q 30/0264

OTHER PUBLICATIONS

Steffen Rendle, "Factorization Machines", Dept. of Reasoning for Intelligence; The Institute of Scientific and Industrial Research; Osaka University, Japan; 2010.

Chih-Jen Lin; "Matrix Factorization and Factorization Machines for Recommender Systems"; Department of Computer Science National Taiwan University; Talk at SDM workshop on Machine Learning Methods on Recommender Systems, May 2, 2015; https://www.csie.ntu.edu.tw/~cjlin/talks/sdm2015.pdf.

"Factorization Machines in Python"; Downloaded on Sep. 9, 2019; https://github.com/coreylynch/pyFM.

\* cited by examiner

| Model | # of records to evaluate | # of users in result | Individual auc mean | Individual auc median |
|---|---|---|---|---|
| Matrix Factorization Model | 2,360,414 | 22,940 | 0.5593 | 0.5610 |
| Factorization Machine Model | 2,360,414 | 22,940 | 0.5738 | 0.5773 |
| Neural Network | 2,360,414 | 22,940 | 0.5695 | 0.5723 |
| Individual response rate - baseline | 1,933,344 | 21,344 | 0.5560 | 0.5481 |
| Population response rate - baseline | 2,360,414 | 22,940 | 0.5473 | 0.5475 |

*Fig. 9*

UTILIZING A RECOMMENDATION SYSTEM APPROACH TO DETERMINE ELECTRONIC COMMUNICATION SEND TIMES

BACKGROUND

Advancements in software and hardware platforms have led to a variety of improvements in systems that provide targeted digital communications to client devices. For example, digital communication distribution systems are now able to provide digital communications to many different client devices across computer networks based on previous digital interactions with digital content. Indeed, some systems can select distribution times to provide digital communications to client devices based on pre-determined heuristics, fixed day/time batch delivery, and/or rule-based methods (e.g., population response rate and A/B testing).

Despite these advances however, conventional digital communication distribution systems continue to suffer from a number of disadvantages, particularly in their accuracy, efficiency, and flexibility. Indeed, conventional systems often inaccurately determine distribution times for providing digital communications to client devices or users and thus ineffectively elicit client device responses. As mentioned, many of these conventional systems (such as population response rate systems) utilize fixed day/time delivery methods to determine delivery times for a population of recipients as a whole. Other conventional systems, such as A/B testing systems, compare distribution times only two at a time (e.g., 9 am vs. 10 am or weekend vs. weekday), which undermines the ability to determine rankings for a variety of possible distribution times. As a result, these systems fail to accurately determine effective distribution timing for providing digital communications to individual recipient devices across large numbers of possible distribution times.

Additionally, many conventional digital communication distribution systems are inefficient. For example, many conventional digital communication distribution systems rely on time-consuming computationally intensive testing (such as AB testing) to compare large numbers of potential distribution times two at a time before finally selecting a distribution time. In addition, due at least in part to the inaccuracy of conventional systems, these systems further inefficiently utilize computer resources in generating and providing excessive digital communications to client devices/users at ineffective times.

Moreover, many conventional digital communication distribution systems are also inflexible. For example, many digital communication distribution systems are limited to population-based timing determinations and therefore cannot adapt to individualized recipient-specific information relating to historical behavior and preferences. For example, conventional systems often distribute the same electronic communications at the same time and at the same frequency to recipients, irrespective of how and when individual recipients (or similar recipients) have responded in the past. Thus, the one-size-fits-all approach of these systems further exacerbates their inaccuracy and inefficiency on an individual client device scale.

Thus, there are several disadvantages with regard to conventional digital communication distribution systems.

SUMMARY

One or more embodiments described herein provide benefits and solve one or more of the foregoing or other problems in the art with systems, methods, and non-transitory computer readable media that utilize a recommendation system model to determine send times for distributing electronic communications. In particular, the disclosed systems can determine send times by analyzing individual users/client devices as a recommendation system problem to leverage machine learning techniques to learn user preferences (or client device preferences) based on borrowing population-based data. For example, the disclosed systems can determine individual send times for electronic communications on an individual user or client device level based on behaviors of similar users/client devices at similar send times. In some embodiments, the disclosed systems can implement collaborative filtering techniques to determine response rates (e.g., open rates, click rates, or conversion rates) associated with users/client devices, send times, and/or individual electronic communications. The disclosed systems can utilize a recommendation system model such as a matrix factorization model, a factorization machine model, or a neural network to determine predicted response rates. By implementing a recommendation system approach, the disclosed systems can provide a personalized solution to determining send times in an accurate, efficient manner.

Additional features and advantages of the present application will be set forth in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which:

FIG. 9 illustrates an example table illustrating improvements of the distribution time determination system over conventional systems in accordance with one or more embodiments;

DETAILED DESCRIPTION

Figure 1:
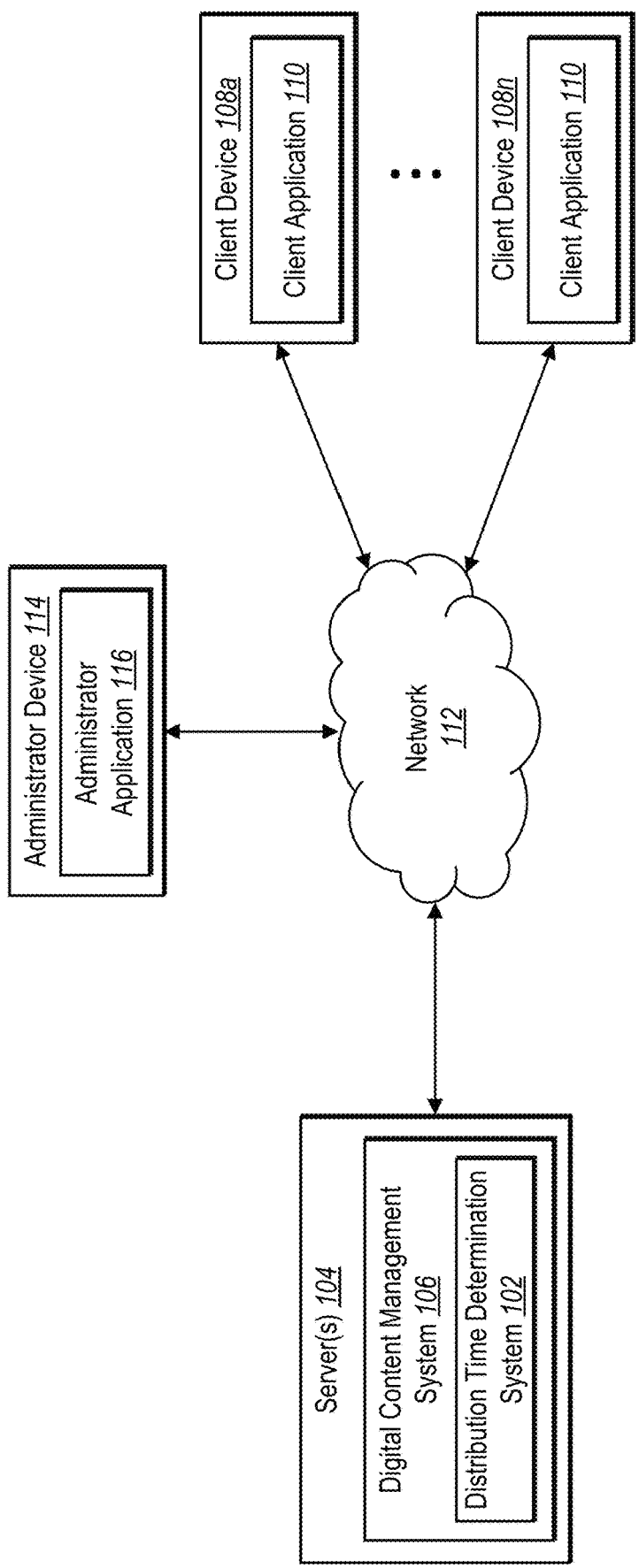
FIG. 1 illustrates an example system environment for implementing a distribution time determination system in accordance with one or more embodiments.

One or more embodiments described herein provide benefits and solve one or more of the foregoing or other problems in the art with a distribution time determination system that can utilize a recommendation model to determine send times for distributing digital content to client devices. For example, the distribution time determination system can utilize a recommendation system model (e.g., a matrix factorization model, a factorization machine model, or a neural network) to generate predictions for response rates and then utilize the response rates to select send times for providing digital content. In some embodiments, the distribution time determination system can generate response rates for individual users or client devices by send time to indicate rates at which client devices will respond to electronic communications distributed at particular send times. For example, the distribution time determination system can implement a collaborative filtering technique to determine predicted response rates based on borrowing information from other uses. This approach can improve accuracy, especially when user and send time information is sparse. Based on the predicted response rates, the distribution time determination system can further generate distribution schedules for individual users/client devices and can distribute electronic communications to the users/client devices according to the distribution schedules.

As just mentioned, the distribution time determination system can utilize a recommendation system approach to determine send times for distributing digital content to users or client devices. In particular, the distribution time determination system can determine predicted response rates for a particular user/client device at various send times and then select optimal (or near-optimal) send times for distributing digital content. For example, the distribution time determination system can determine response rates for send times having a particular time granularity (e.g., 24 hours in a day, 7 days in a week, 168 hours in a week, etc.). Thus, the distribution time determination system can generate a predicted response rate schedule for a user that indicates at what probability the user will respond to electronic communications distributed at the various send times within the schedule. The distribution time determination system can similarly generate predicted response rate schedules for other users/client devices as well.

The distribution time determination system can determine predicted response rates such as open rates, click rates, conversion rates, or composite rates based on combinations of one or more of the above. In some embodiments, the distribution time determination system utilizes an area under the curve ("AUC") evaluation metric to evaluate a recommendation system model based on probabilities or measures of likelihood that a user will respond at various send times. Further, the distribution time determination system can rank send times on a user-by-user basis based on AUC scores to determine most effective send times for users. In some embodiments, the distribution time determination system can distribute a sparse volume of electronic communications, which can result in unstable predictions of response rates at fine time granularities. To reduce the noise of individual-level data and thereby improve the stability of predicted response rates, the distribution time determination system can implement multiple methods to bucket send times, and the distribution time determination system can select a time granularity that satisfies a threshold individual AUC score level (or select a time granularity that results in a highest individual AUC score).

In some embodiments, to determine a predicted response rate for a user, the distribution time determination system can utilize a recommendation system model in the form of a matrix factorization model. In particular, the distribution time determination system can utilize a matrix factorization model as a collaborative filtering algorithm to determine predicted response rates at send times based on a user-time identification matrix that indicates response rates for the cross-sections of various user identifications and send time identifications within the matrix. For example, the distribution time determination system can decompose the user-time identification matrix into a user identification matrix and a send time identification matrix and can impute missing response rate values of the user-time identification matrix by utilizing an optimization algorithm. Additional detail regarding the matrix factorization model is provided below with reference to FIG. 5.

In some embodiments, to determine a predicted response rate for a user, the distribution time determination system can utilize a recommendation system model in the form of a factorization machine model. More particularly, the distribution time determination system can utilize a factorization machine model to generate predicted response rates via a binary classification based on user features and send time features. For example, the distribution time determination system can generate user feature vectors for users and send time feature vectors for candidate send times. Based on the user feature vectors and the send time feature vectors, the distribution time determination system can model user-time interactions by mapping them (the interactions) to a low dimensional space. In some embodiments, the distribution time determination system can utilize the low dimensional user-time feature interactions to generate binary labels of 0 or 1 for particular send times to indicate whether or not a user will respond at the send time (e.g., 0 for no, 1 for yes). Additional detail regarding the factorization machine model is provided below with reference to FIG. 6.

In one or more embodiments, to determine a predicted response rate for a user, the distribution time determination system can utilize a recommendation system model in the form of a neural network. In particular, the distribution time determination system can generate latent representations of users and candidate send times—e.g., user embeddings and candidate send time embeddings. In some embodiments, the distribution time determination system can also combine the user embeddings and the candidate send time embeddings by, for example, concatenating the embeddings together. Further, the distribution time determination system can pass the concatenated user-time embeddings through a neural network to generate a binary label indicating whether or not the user corresponding to the user embedding will respond at the candidate send time corresponding to the candidate send time embedding. Additional detail regarding the neural network is provided below with reference to FIG. 7.

As mentioned, the distribution time determination system can generate a distribution schedule for providing electronic communications to users or client devices. In particular, the distribution time determination system can generate distribution schedules for individual users/client devices based on predicted response rates for the respective users/client devices. Additionally, in some embodiments, the distribution time determination system can distribute electronic communications to the users/client devices based on the corresponding distribution schedules.

The distribution time determination system can provide several advantages over conventional digital communication distribution systems. For example, the distribution time determination system can improve accuracy relative to these conventional systems. More specifically, the distribution time determination system can more accurately determine send times for distributing electronic communications to elicit user responses. As opposed to conventional systems that utilize fixed day/time delivery methods for distributing electronic communications on a population-level basis, the distribution time determination system can determine response rates for users/client devices on an individualized basis to distribute electronic communications at effective candidate send times. Additionally, rather than conventional AB testing systems that compare only two send times at a time, the distribution time determination system can implement a recommendation system model that determines predicted response rates for potentially large numbers of candidate send times to select those candidate send times with higher probabilities of resulting responses. Further, by borrowing population data in utilizing a recommendation system model, the distribution time determination system can accurately determine response rates for send times even with sparse user-specific data.

In addition, the distribution time determination system can improve efficiency over conventional systems. For example, in contrast to conventional systems that rely on time consuming, expensive test-based models (e.g., AB testing), the distribution time determination system can utilize a recommendation system model that quickly, efficiently, and automatically determines predicted response rates for individual users at various send times. Additionally, due at least in part to the improved accuracy of the distribution time determination system, the distribution time determination system can further improve efficiency over conventional systems by providing electronic communications at more effective times for eliciting user responses. Thus, compared to conventional systems, the distribution time determination system can waste fewer computer resources in generating and distributing electronic communications to yield improved results.

As a further advantage, the distribution time determination system can improve flexibility over conventional digital communication distribution systems. Particularly, the distribution time determination system can flexibly adapt on an individual-by-individual basis. Indeed, whereas many conventional systems are limited to population-level distribution of electronic communications, the distribution time determination system can uniquely tailor distribution schedules to individual users/client devices.

As illustrated by the foregoing discussion, the present disclosure utilizes a variety of terms to describe features and benefits of the distribution time determination system. Additional detail is hereafter provided regarding the meaning of these terms as used in this disclosure. In particular, the term "electronic communication" (or simply "communication") refers to electronic data provided to client device(s) of a user or a group of users. An electronic communication can include an electronic message of a variety of formats using a number of protocols such as email messages, text (e.g., SMS, MMS, RCS, or iMessage) messages, phone calls, mobile short messages, mobile application push notifications, web browser push notifications, or targeted digital content campaign banners. In addition, an electronic communication can include digital content in the form of digital audio, digital video, digital images, and/or digital text. Further, an electronic communication can include information pertaining to a product or service related to a digital content campaign. Indeed, electronic communications can be distributed to users as part of a digital content campaign.

As mentioned, the distribution time determination system can generate predictions of various response rates for individual users, such as open rates, click rates, and conversion rates (or scores). As used herein, the term "response rate" refers to an indication of a frequency, pace, probability, or likelihood of whether or not a particular user (or client device) will perform one or more actions in response to an electronic communication. Relatedly, the terms "open rate," "click rate," and "conversion rate" (or "open score", "click score," and "conversion score") refer to a frequency, pace, probability, or likelihood of user actions (or inactions) associated with, or instigated by, electronic communications. In particular, "open rate," "click rate," and "conversion rate" can include a rate (e.g., a frequency, pace, likelihood, or probability) that reflects user interactions resulting from distributing electronic communications. For example, an open rate can include a probability that a client device or user will open an electronic communication (e.g., open, read, or view an electronic communication) at a particular candidate send time. Similarly, a click rate can include a probability that a client device or user will click (e.g., a select or interact with a selectable element within an electronic communication) at a particular candidate send time. Along these lines, a conversion rate can include a probability of a conversion (e.g., a subscription, purchase, or visit to a website) at a particular candidate send time.

To generate response rates, the distribution time determination system can utilize a recommendation system model. As used herein, the term "recommendation system model" refers to a model (e.g., a machine learning model) for generating recommendations (e.g., for client devices or users). In particular, a recommendation system model can include systems that generate personalized recommendations to tailor selections to client device or user preferences. For example, a recommendation system model can include a machine learning model for generating a recommendation for a user/client device based on collaborative filtering of data (e.g., historical behavior data of various users). The distribution time determination system is the first of its kind to utilize a recommendation system model (traditionally used to generate recommendations for a set of items) to select a send time for distributing digital content.

The distribution time determination system can utilize a recommendation system model in the form of a matrix factorization model. A "matrix factorization model" refers to a recommendation system model that utilizes matrix factorization to decompose a user-item interaction matrix into lower dimensionality matrices. For example, as outlined in greater detail below the distribution time determination system can utilize a matrix factorization model to decompose a user-time identification matrix to generate predicted response rates based on matrix intersections of user identifications and send time identifications. In some embodiments, the distribution time determination system utilizes a recommendation system model in the form of a factorization machine model. A "factorization machine model" refers to a recommendation system that models interactions of variables by mapping the interactions to a low dimensional space. For example, a factorization machine can model user-time interactions (based on user features and send time features) by mapping the interactions between user features and send time to a low-dimensional space. Thus, the distribution time determination system can utilize a factorization machine model to generate predicted response rates by send time based on mapping interactions of user features and send time features to a low-dimensional space. Additional detail regarding factorization machine models is provided below.

In other embodiments, the distribution time determination system utilizes a recommendation system model in the form of a neural network. A "neural network" refers to a machine learning model that can be tuned (e.g., trained) based on inputs to approximate unknown functions. In particular, the term neural network can include a model of interconnected artificial neurons (e.g., organized in layers) that communicate and learn to approximate complex functions and generate outputs based on a plurality of inputs provided to the model. In addition, a neural network can refer to an algorithm (or set of algorithms) that implements deep learning techniques that utilize a set of algorithms to model high-level abstractions in data. To illustrate, a neural network can include a convolutional neural network, a recurrent neural network, a generative adversarial neural network, and/or a graph neural network.

Relatedly, the term "train" refers to utilizing information to tune or teach a model (e.g., by adjusting one or more weights of a recommendation system model) such as the matrix factorization model, the factorization machine model, or the neural network. The term "training" (used as an adjective or descriptor, such as "training data") refers to information or data utilized to tune or teach the model. In some embodiments, the distribution time determination system trains one or more models to generate accurate predictions based on training data.

To generate the predicted response rates, the distribution time determination system can generate or identify feature records as input for a recommendation system model. As used herein, the term "feature record" (e.g., "user feature record" or "historical feature record") refers to a set of information or data associated with a user/client device, a candidate send time, or an electronic communication. For example, a user feature record or a historical feature record can include a user identification, an age of the user, a location of the user, and a domain of the user. In some embodiments, feature records also (or alternatively) include historical behavior information indicating user responses (or lack thereof) to electronic communications at previous send times. In these or other embodiments, the term "feature" (as included within or generated from a feature record) can include observable characteristics or information pertaining to a user, a send time, or an electronic communication. Additionally (or alternatively), a feature can include latent features and/or unobservable deep features generated by a recommendation system model.

Based on generated predicted response rates, the distribution time determination system can further generate response rate schedules for individual users. As used herein, the term "response rate schedule" refers to a collection of response rates corresponding to individual candidate send times for a particular user or client device. For example, a response rate schedule can include predicted response rates for a user at each of a sequence of candidate send times.

Further, the distribution time determination system can generate distribution schedules for distributing electronic communications based on response rate schedules. As used herein, the term "distribution schedule" refers to a set of one or more individual send times for distributing electronic communications to users. A distribution schedule can include, for each individual send time, an indication of whether or not to distribute electronic communications. In some embodiments, a distribution schedule refers to a vector of binary variables corresponding to one or more time slots representing individual distribution times over a time horizon, where each time slot includes a binary decision to distribute (e.g., a "1") or refrain from distributing (e.g., a "0") electronic communications. A distribution schedule can also include a user identification along with electronic communication identifications corresponding to particular send times indicating which electronic communications to distribute to the user at which send times.

Relatedly, the term "time horizon" refers to a measure or scale of time. Indeed, a time horizon can refer to a period of time spanning one day, one week, one month, six months, one year, etc. For example, a time horizon can refer to a one-month period where the distribution time determination system generates a distribution schedule with a particular "time granularity" to indicate whether or not to distribute electronic communications for individual send times (e.g., days in a month, hours in a week, etc.). The term "send time" (or "distribution time") refers to a time to provide an electronic communication to a client device/user. For example, a send time can refer to an individual time slot within a distribution schedule. In one or more embodiments, the distribution time determination system provides electronic communications to client devices of users based on send times to increase the probability of eliciting a response.

Additional detail regarding the distribution time determination system will now be provided with reference to the figures. For example, FIG. 1 illustrates a schematic diagram of an example system environment for implementing a distribution time determination system 102 in accordance with one or more embodiments. An overview of the distribution time determination system 102 is described in relation to FIG. 1. Thereafter, a more detailed description of the components and processes of the distribution time determination system 102 is provided in relation to the subsequent figures.

As shown in FIG. 1, the environment includes server(s) 104, client devices 108a-108n, an administrator device 114, and a network 112. Each of the components of the environment can communicate via the network 112, and the network 112 may be any suitable network over which computing devices can communicate. Example networks are discussed in more detail below in relation to FIG. 13.

As mentioned, the environment includes the client devices 108a-108n. The client devices 108a-108n can be one of a variety of computing devices, including a smartphone, a tablet, a smart a television, a desktop computer, a laptop computer, a virtual reality device, an augmented reality device, or some other computing device as described in relation to FIG. 13. FIG. 1 illustrates multiple different client devices 108a-108n, where each of the client devices 108a-108n can receive user input from users in the form of user actions such as opens, clicks, subscription cancellations, deletions, purchase, add-to-carts, etc., to electronic communications and can provide information pertaining to user input to the server(s) 104. Thus, the distribution time determination system 102 on the server(s) 104 can receive responses to electronic communications in the form of indications of user actions (e.g., opens, clicks, conversions, etc.) provided to the client devices 108a-108n.

As shown, the client devices 108a-108n include a client application 110. In particular, the client application 110 may be a web application, a native application installed on the client devices 108a-108n (e.g., a mobile application, a desktop application, etc.), or a cloud-based application where all or part of the functionality is performed by the server(s) 104. The client application 110 can present or display information to a user, including an electronic communication within an email interface, text messaging interface, or another messaging or communication interface. Users can interact with the client application 110 to provide user input to, for example, open, click through, delete, cancel, or complete a purchase related to an electronic communication.

As further shown, the environment includes the administrator device 114. In particular, the administrator device 114 can communicate with the server(s) 104 and/or the client device 108a-108n via the network 112. For example, the administrator device 114 can receive input from an administrator via the administrator application 116 to set campaign parameters associated with a digital content campaign and/or for distributing electronic communications to the client devices 108a-108n. For instance, the administrator device 114 can provide, to the distribution time determination system 102, target metrics such as a target time horizon, a target time granularity, a maximum number of distributed electronic communications, a target number of responses, weights, and/or exclusion dates/times. The administrator application 116 may be a web application, a native application installed on the administrator device 114 (e.g., a mobile application, a desktop application, etc.), or a cloud-based application where all or part of the functionality is performed by the server(s) 104. In addition, the administrator application 116 may include functionality to set target metrics for the digital content management system 106 and/or the distribution time determination system 102 to distribute electronic communications to the client devices 108a-108n. In some embodiments, the administrator application 116 can also allow for selection of other digital content campaign parameters (e.g., duration, price, target audience, etc.) or provide digital content to include in electronic communications.

As illustrated in FIG. 1, the environment includes the server(s) 104. The server(s) 104 may generate, store, process, receive, and transmit electronic data, such as electronic communications and responses to electronic communications. For example, the server(s) 104 may identify (e.g., monitor and/or receive) data from the client device 108a in the form of a click, an open, a subscription cancellation, a deletion, etc. The server(s) 104 can transmit data to the client devices 108a-108n to provide electronic communications for display via the client application 110. In addition, the server(s) 104 can receive data from the administrator device 114 in the form of a selection of campaign parameters, digital content (to include in electronic communications), target metrics such as a target time horizon, a target time granularity, and/or a target number of responses. The server(s) 104 can communicate with the client devices 108a-108n and the administrator device 114 to transmit and/or receive data via the network 112. In some embodiments, the server(s) 104 comprises a content server. The server(s) 104 can also comprise an application server, a communication server, a web-hosting server, a social networking server, a digital content campaign server, or a digital communication management server.

As shown in FIG. 1, the server(s) 104 can also include the distribution time determination system 102 (implemented as part of a digital content management system 106). The digital content management system 106 can communicate with the client devices 108a-108n to generate, modify, and transmit digital information, such as electronic communications. In some embodiments, though not illustrated in FIG. 1, the server(s) 104 further include one or more databases such as a training database and/or an electronic communication database. In other embodiments, the database(s) are located externally from the server(s) 104 and are maintained by a third-party server connected via the network 112.

Although FIG. 1 depicts the distribution time determination system 102 located on the server(s) 104, in some embodiments, the distribution time determination system 102 may be implemented by (e.g., located entirely or in part on) one or more other components of the environment. For example, the distribution time determination system 102 may be implemented by the administrator device 114, the client devices 108a-108n, and/or a third-party device.

In some embodiments, though not illustrated in FIG. 1, the environment may have a different arrangement of components and/or may have a different number or set of components altogether. For example, the administrator device 114 and/or the client devices 108a-108n may communicate directly with the distribution time determination system 102, bypassing the network 112. Additionally, the distribution time determination system 102 can include one or more additional databases (e.g., a training database storing training data) housed on the server(s) 104 or elsewhere in the environment.

Figure 2:
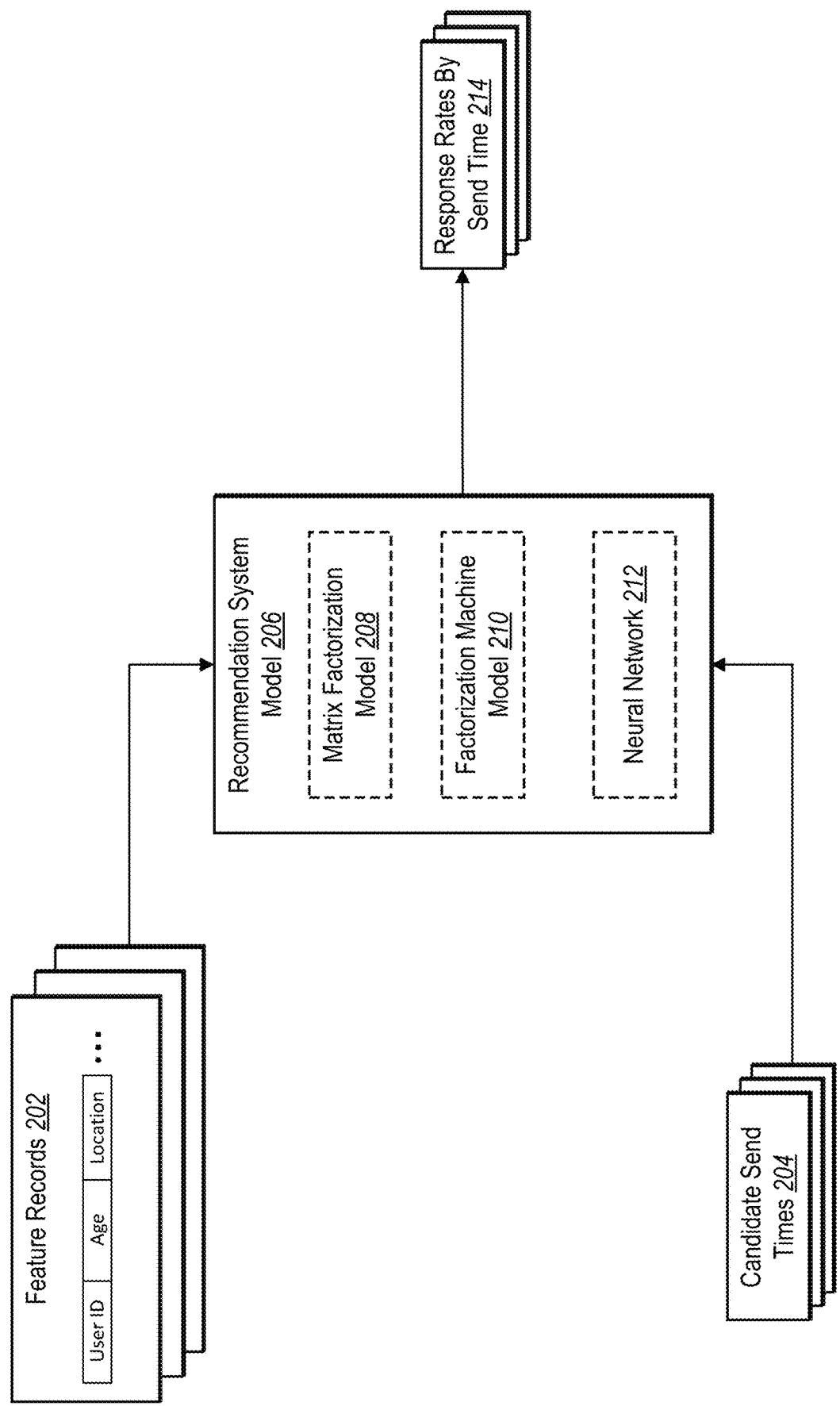
FIG. 2 illustrates an example overview of generating predicted response rates by send time by utilizing a recommendation system model in accordance with one or more embodiments.

As mentioned, the distribution time determination system 102 can generate predicted response rates by send time. In particular, the distribution time determination system 102 can utilize a recommendation system model to, for a given user or client device, generate predicted response rates for particular send times based on input information such as feature records and candidate send times. FIG. 2 illustrates generating response rates by utilizing a recommendation system model in accordance with one or more embodiments. The description of FIG. 2 provides a high-level overview of the functionalities of the distribution time determination system 102 in generating predicted response rates for users based on candidate send times. Thereafter, additional detail regarding the various components and functionalities of the distribution time determination system 102 is provided with reference to the subsequent figures.

As illustrated in FIG. 2, the distribution time determination system 102 identifies or generates feature records 202 to input into a recommendation system model 206. In particular, the distribution time determination system 102 identifies or generates feature records for particular user (e.g., a target user) and identifies feature records for other users as well. For example, the distribution time determination system 102 identifies information associated with users such as a user identification (e.g., a username or a user identification number), an age associated with the user, a location associated with the user (e.g., geographic coordinates indicating a location of a client device), and/or a domain associated with a user (e.g., an IP address of a client device). In some embodiments, the distribution time determination system 102 generates the feature records 202 to include one or more of the above or other pieces of information such as gender, occupation, marital status and/or historical behavior data indicating responses to previous electronic communications. Indeed, the distribution time determination system 102 generates a feature record for each user or client device.

As also illustrated in FIG. 2, the distribution time determination system 102 identifies candidate send times 204 to input into the recommendation system model 206. In particular, the distribution time determination system 102 determines a particular time granularity over a time horizon from which to select the candidate send times 204. In some embodiments, the distribution time determination system 102 determines the time granularity for the candidate send times 204 by receiving an indication of a target time granularity from an administrator via the administrator device 114. In other embodiments, the distribution time determination system 102 determines the time granularity for the candidate send times 204 by utilizing one or more bucketing techniques. For example, to reduce noise of individual-level data, the distribution time determination system 102 buckets send times by various time granularities (e.g., finer granularities such as hours in a week or coarser granularities such as weeks in a month) and selects a time granularity that satisfies a threshold AUC score (or that achieves a highest AUC score).

Indeed, the distribution time determination system 102 utilizes an AUC score as an evaluation metric for selecting the candidate send times 204. Particularly, the distribution time determination system 102 determines, for a given user, AUC scores for individual candidate send times. The AUC scores represent measures of separability, where higher AUCs correspond to better predictions of the recommendation system model 206. Thus, to select an appropriate time granularity, in some embodiments, the distribution time determination system 102 utilizes the recommendation system model 206 to generate the response rates by send time 214 over multiple iterations for different potential time granularities to determine which time granularity has the highest AUC (or has an AUC that satisfies a threshold).

Based on determining the candidate send times 204 and the feature records 202, the distribution time determination system 102 further inputs the candidate send times 204 and the feature records 202 into the recommendation system model 206. Indeed, in some embodiments the distribution time determination system 102 utilizes a matrix factorization model 208 as a recommendation system model 206, while in other embodiments the distribution time determination system 102 utilizes a factorization machine model 210 or a neural network 212. In any event, the distribution time determination system 102 utilizes the recommendation system model 206 to generate the response rates by send time 214. Indeed, the distribution time determination system 102 utilizes the recommendation system model 206 to apply one or more collaborative filtering techniques to compare the feature records 202 and to determine the response rates by send time 214 based on the comparison. For example, the distribution time determination system 102 determines relationships or similarities between a given user and other users (based on their respective feature records) to base predicted response rates for the given user on the behavior (and/or other features) of other users. Additional detail regarding collaborative filtering to generate predicted response rates based on historical behavior data of other users is provided below with reference to FIG. 4.

Figure 3:
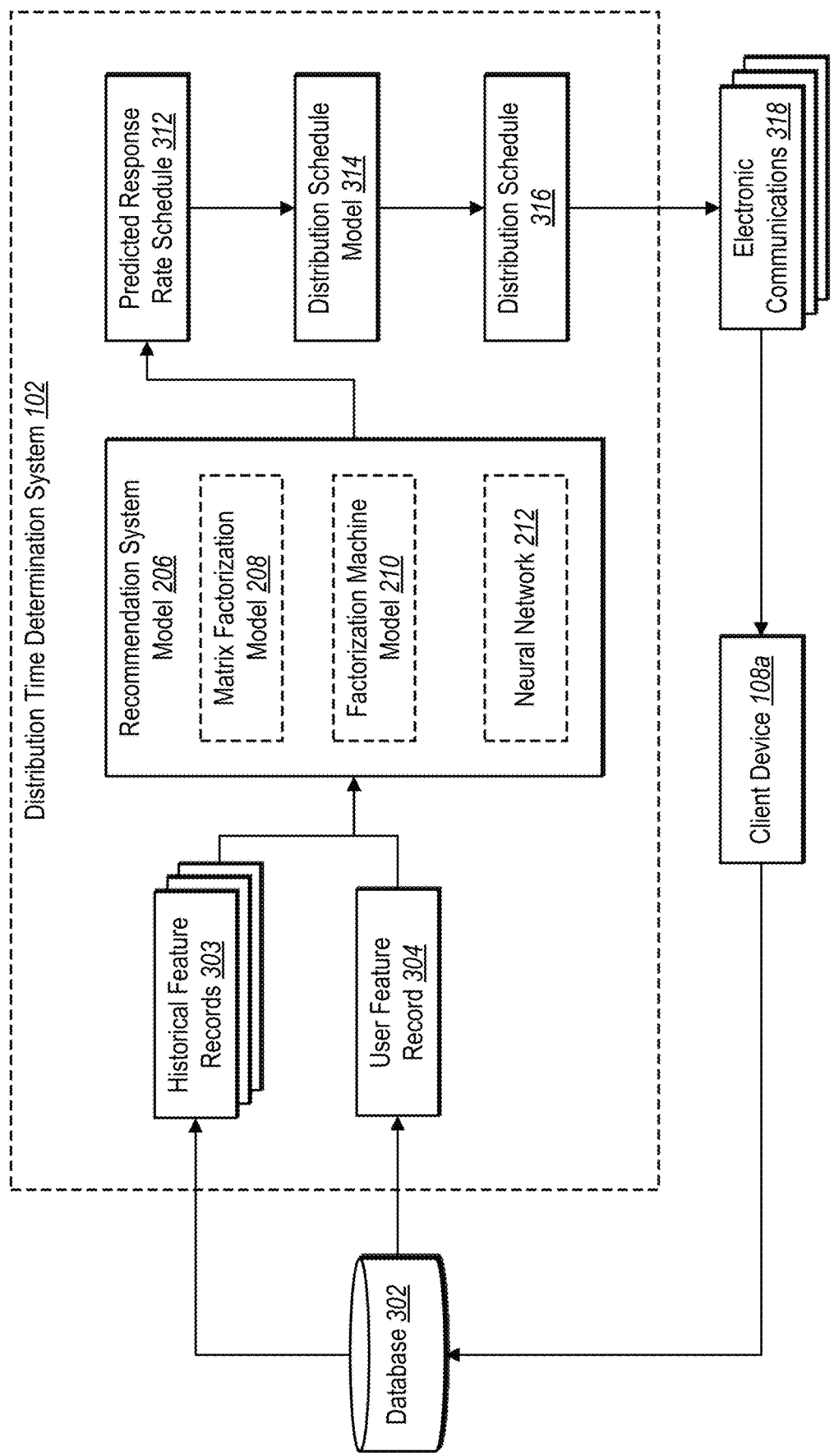
FIG. 3 illustrates an example framework of the distribution time determination system in accordance with one or more embodiments.

As mentioned, the distribution time determination system 102 can generate a predicted response rate schedule for a user or a client device based on inputting feature records (e.g., a user feature record for the user and historical feature records for other users) into a recommendation system model (e.g., the recommendation system model 206). In particular, the distribution time determination system 102 can determine response rates for individual candidate send times and can generate a response rate schedule that indicates the response rates for the respective candidate send times. For example, FIG. 3 illustrates a possible flow illustrating interactions between various components of the distribution time determination system 102 for generating a predicted response rate schedule 312 for a user (e.g., the user associated with the client device 108a) in accordance with one or more embodiments. As also shown in FIG. 3, the distribution time determination system 102 generates a distribution schedule 316 for the user that indicates which candidate send times to use for providing electronic communications to the user.

As illustrated in FIG. 3, the distribution time determination system 102 utilizes a recommendation system model 206 to generate a predicted response rate schedule 312 based on the user feature record 304 associated with the user (or the client device 108a) and further based on the historical feature records 303 associated with other users. By utilizing the recommendation system model 206, the distribution time determination system 102 can generate individualized response rate schedules for accurately determining effective send times for distributing electronic communications to users or client devices.

To elaborate, as described above, the distribution time determination system 102 obtains, identifies, or generates the user feature record 304 from user information stored within the database 302. For example, the distribution time determination system 102 generates a feature record that includes a user identification, an age, a location, a domain, historical response behavior of the user, and/or other user information as mentioned above to define the user with the user feature record 304. In a similar fashion, the distribution time determination system 102 obtains, identifies, or generates the historical feature records 303 associated with other users from user information stored within the database 302. In some embodiments, the distribution time determination system 102 generates the historical feature records 303 (and/or the user feature record 304) to include indications of whether or not respective users responded to particular electronic communications distributed at particular send times. The user feature record 304 may (or may not) include historical response information for a user.

Based on the user feature record 304 associated with the user and the historical feature records 303 associated with other users, the distribution time determination system 102 utilizes the recommendation system model 206 to generate predicted response rates for one or more candidate send times to include within the predicted response rate schedule 312. For instance, the distribution time determination system 102 utilizes a matrix factorization model 208, a factorization machine model 210, and/or a neural network 212 to employ collaborative filtering of the user feature record 304 and the historical feature records 303.

To elaborate, the distribution time determination system 102 bases the prediction of response rates for the user associated with the user feature record 304 on indications of responses of other (e.g., similar) users at various candidate send times, as indicated by the historical feature records 303. Thus, based on collaborative filtering to determine relationships between the user feature record 304 and the historical feature records 303, the distribution time determination system 102 predicts response rates for one user based on responses of other users to include within the predicted response rate schedule 312.

As mentioned above, the distribution time determination system 102 generates a predicted response rate such as an open rate, a click rate, or a conversion rate for a candidate send time (e.g., based on input received from the administrator device 114 to indicate a target response rate type). In some embodiments, the distribution time determination system 102 ranks candidate send time according to their respective predicted response rates. Thus, the distribution time determination system 102 can recommend send times for providing electronic communications to a user or client device based on the ranking. For instance, the distribution time determination system 102 can select a top number (e.g., 5 or 10) send times or can select send times that have predicted response rates that satisfy a threshold response rate.

In one or more embodiments, the distribution time determination system 102 generates a composite response rate based on two or more of the open rate, the click rate, and/or the conversion rate. For example, the distribution time determination system 102 can generate a composite response rate based on all three of the open rate, the click rate, and the conversion rate by weighting each of the open rate, the click rate, and the conversion rate and determining a weighted combination of the rates. In some embodiments, the distribution time determination system 102 determines weights based on input from the administrator device 114 to indicate measures of bias to apply to the different rates (e.g., to emphasize or prioritize one response rate type over another). In these or other embodiments, the distribution time determination system 102 includes the composite response rates within the predicted response rate schedule 312.

Further, the distribution time determination system 102 can generate predicted response rates for inclusion within the predicted response rate schedule 312 utilizing a single recommendation system model 306 or multiple recommendation system models 306. For instance, to use a single recommendation system model 306, the distribution time determination system 102 determines AUC scores for the different recommendation system models 306 and selects the model with the best AUC. To use multiple recommendation system models 306, in some embodiments, the distribution time determination system 102 utilizes the matrix factorization model 208 to generate predicted response rates for a user, while in other embodiments the distribution time determination system 102 utilizes a factorization machine model 210 or a neural network 212 to generate predicted response rates. In other embodiments, however, the distribution time determination system 102 utilizes two or more of the matrix factorization model 208, the factorization machine model 210, and the neural network 212 to generate predicted response rates.

For example, the distribution time determination system 102 utilizes the matrix factorization model 208 to generate a predicted response rate for a given send time and further utilizes the factorization machine model 210 to generate a predicted response rate for the same send time. The distribution time determination system 102 further averages the two model-specific response rates to determine the overall predicted response rate for the send time. Similarly, in some embodiments, the distribution time determination system 102 utilizes all three of the matrix factorization model 208, the factorization machine model 210, and the neural network 212 to determine predicted response rates for a given send time, and the distribution time determination system 102 averages (or otherwise combines) the predicted response rates to determine an overall predicted response rate.

In these or other embodiments, the distribution time determination system 102 utilizes different recommendation system models 206 for different users or client devices. To elaborate, the distribution time determination system 102 utilizes the matrix factorization model 208 to generate predicted response rates for a first user, utilizes the factorization machine model 210 to generate predicted response rates for a second user, and utilizes the neural network 212 to generate predicted response rates for a third user. The distribution time determination system 102 further monitors the results of distributing electronic communications based on the predicted response rates to compare the results of the different recommendation system models 206. The distribution time determination system 102 can further select a recommendation system model 206 that produces the best results (e.g., best actual response rates) over a given time horizon.

In one or more embodiments, the distribution time determination system 102 utilizes different recommendation system models 206 to generate different predicted response rate schedules for a single user. For example, the distribution time determination system 102 utilizes the matrix factorization model 208 to generate a first predicted response rate schedule, utilizes the factorization machine model 210 to generate a second predicted response rate schedule (for the same time granularity), and utilizes the neural network 212 to generate a third response rate schedule. The distribution time determination system 102 further compares the predicted response rate schedules to determine and select which recommendation system model 206 produces the best response rates.

As further illustrated in FIG. 3, the distribution time determination system 102 utilizes a distribution schedule model 314 to generate a distribution schedule 316 based on the predicted response rate schedule 312. In particular, the distribution time determination system 102 utilizes the distribution schedule model 314 to implement journey optimization for selecting candidate send times to distribute electronic communications to the user or the client device 108*a*. For example, the distribution time determination system 102 applies the distribution schedule model 314 to, based on the predicted response rate schedule 312 together with input parameters from one or more application programming interface ("API") calls (e.g., automatically called by the distribution time determination system 102 or received from the administrator device 114 to administer a digital content campaign), select send times under upper-confidence-bound modification.

Thus, based on selecting send times for distributing electronic communications in accordance with the predicted response rate schedule 312, the distribution time determination system 102 generates the distribution schedule 316. Indeed, the distribution time determination system 102 generates the distribution schedule 316 to indicate at which send times the distribution time determination system 102 will distribute which of the electronic communications 318 to the client device 108*a*. Based on the distribution schedule 316, the distribution time determination system 102 provides the electronic communications 318 to the client device 108*a* at appropriate send times. Additionally, the distribution time determination system 102 monitors responses from the client device 108*a* to store response information (e.g., indications of whether or not a response is received from the client device 108*a* at respective send times) within the database 302 to modify or add to the user feature record 304 (or the historical feature records 303 in the case of generating predicted response rates for a different user).

Figure 4:
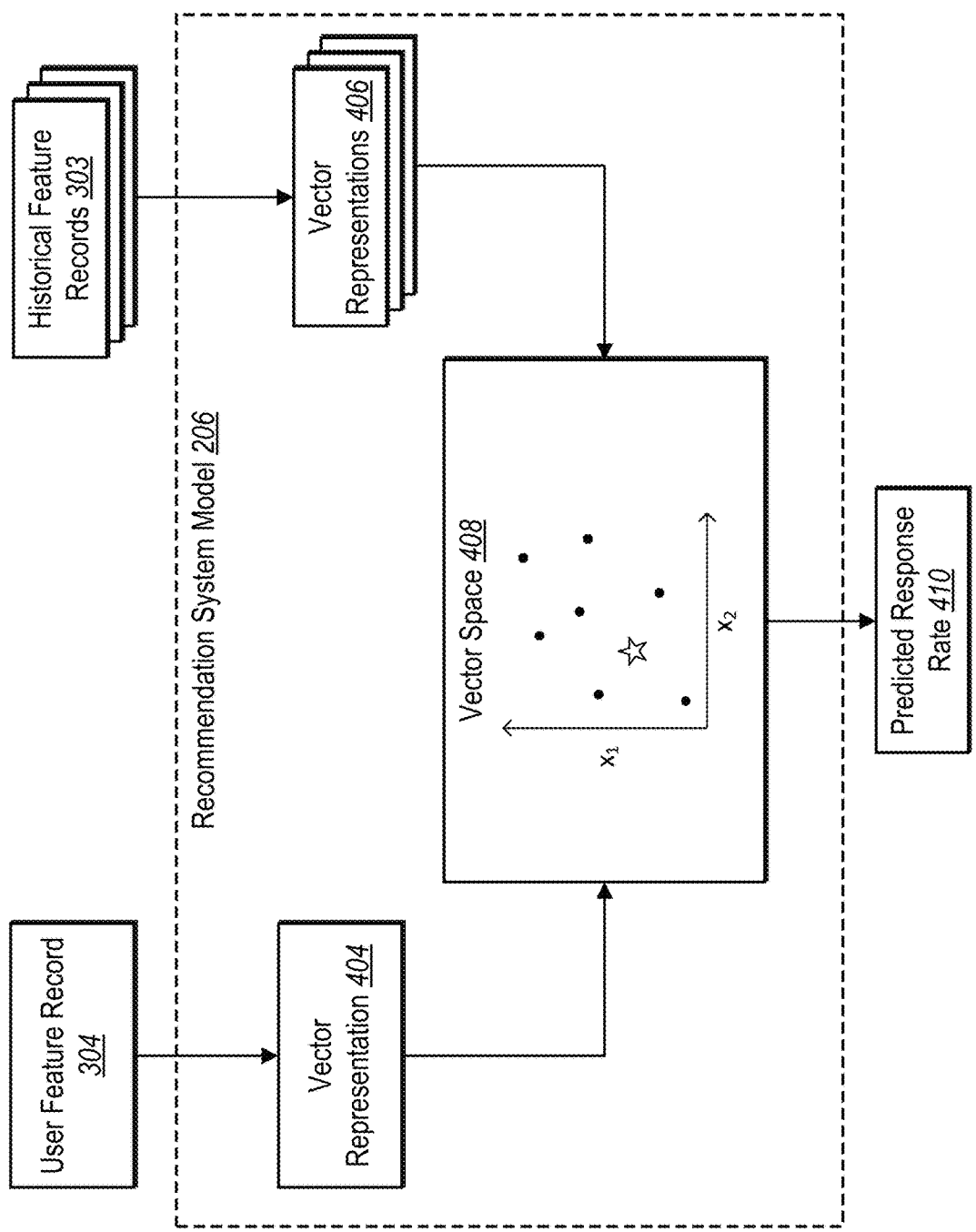
FIG. 4 illustrates an example depiction of collaborative filtering to determine predicted response rates in accordance with one or more embodiments.

As mentioned, the distribution time determination system 102 can utilize a recommendation system model 206 to perform collaborative filtering of feature records to generate response rates. Particularly, the distribution time determination system 102 can compare a user feature record 304 with historical feature records 303 to generate predicted response rates for a user by imputing response information of other (e.g., similar) users to the user. FIG. 4 illustrates an example representation of utilizing a collaborative filtering technique to generate a predicted response rate 410 based on the user feature record 304 and the historical feature records 303 in accordance with one or more embodiments. The illustration of FIG. 4 is merely one example of how the distribution time determination system 102 can utilize collaborative filtering to generate the predicted response rate 410. Indeed, the collaborative filtering techniques of the matrix factorization model 208, the factorization machine model 210, and the neural network 212 may vary in their respective applications.

As shown in FIG. 4, the distribution time determination system 102 determines latent representations of a user (based on the user feature record 304) and other users (based on the historical feature records 303) and determines the predicted response rate 410 based on proximity of the latent representations in latent space. Indeed, as shown, the distribution time determination system 102 generates a vector representation 404 of the user feature record 304 and generates vector representations 406 of the historical feature records 303. For example, the distribution time determination system 102 generates the vector representation 404 and the vector representations 406 based on information within the user feature record 304 and the historical feature records 303, including user identifications, candidate send times, and indications of responses.

Additionally, the distribution time determination system 102 determines relationships between the vector representation 404 and the vector representations 406 by, for example, determining distances between the vectors within the vector space 408. As shown, the distribution time determination system 102 plots the vector representation 404 within the vector space 408 (where $x_1$ and $x_2$ represent features such as user identification and send time) as indicated by the star symbol. The distribution time determination system 102 further plots the vector representations 406 within the vector space 408 as indicated by the scattered dots. In some embodiments, the vectors space 408 includes more than two dimensions for additional latent features.

The distribution time determination system 102 further compares the vector representation 404 and the vector representations 406 within the vector space 408 to generate the predicted response rate 410. For example, the distribution time determination system 102 determines distances or proximities between the vector representation 404 and each of the vector representations 406. Based on these distance relationships, the distribution time determination system 102 generates a prediction of how a user corresponding to the vector representation 404 would respond at one or more candidate send times to determine the predicted response rate 410.

As mentioned, the distribution time determination system 102 can utilize a recommendation system model (e.g., the recommendation system model 206) to perform collaborative filtering for generating predicted response rates. As also mentioned, the distribution time determination system 102 can utilize one or more of various types of recommendation system model to this end. For example, FIG. 5 illustrates generating predicted response rates via the matrix factorization model 208 in accordance with one or more embodiments.

Figure 5:
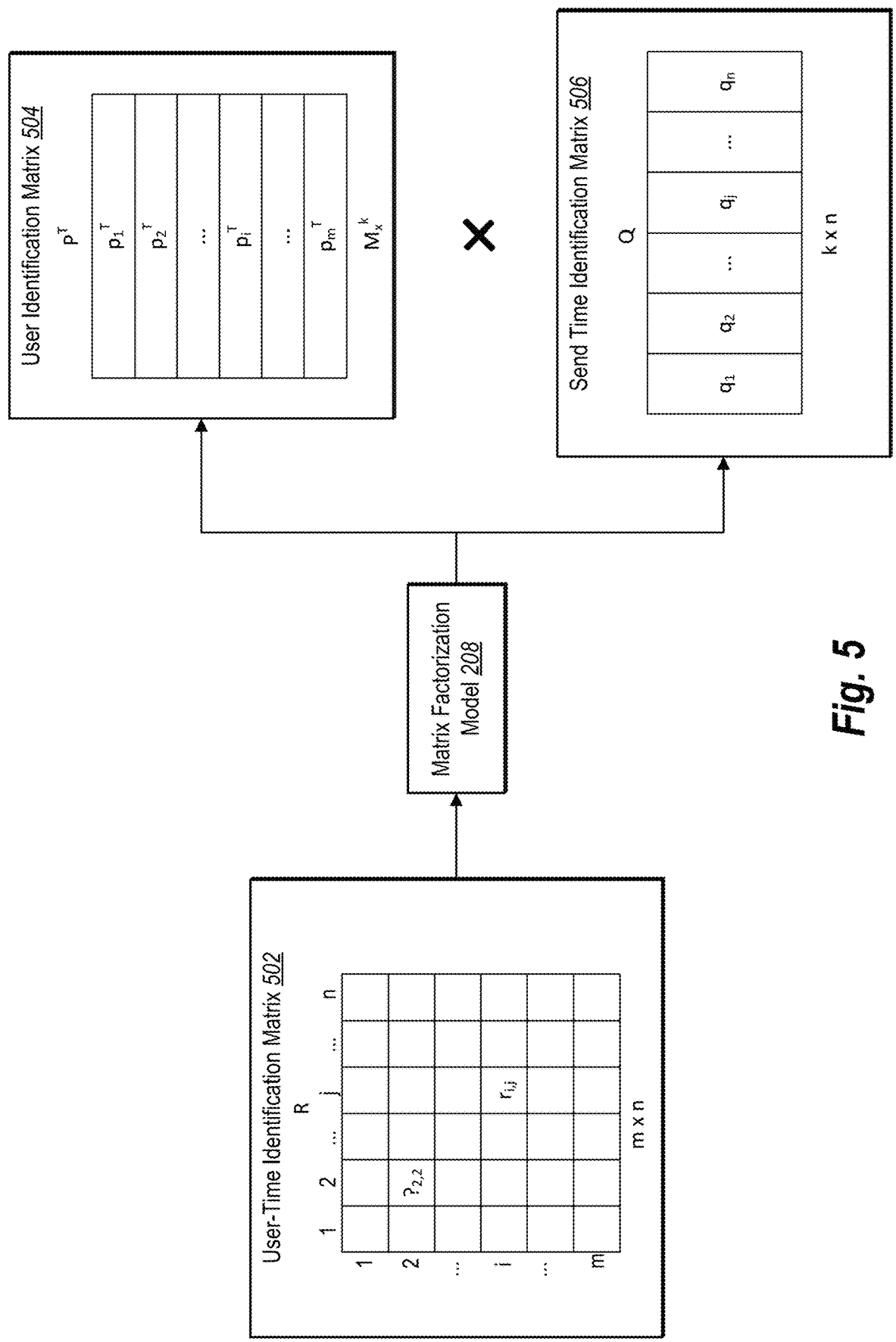
FIG. 5 illustrates an example implementation of a matrix factorization model to generate a predicted response rate in accordance with one or more embodiments.

As illustrated in FIG. 5, the distribution time determination system 102 generates a user-time identification matrix 502 (also denoted as the user-time identification matrix R).

As shown, the user-time identification matrix 502 includes rows that represent user identifications and columns that represent send time identifications. Additionally, the fields within the user-time identification matrix 502 at the intersections of the rows and columns represent response rates. Thus, for a given field, the user-time identification matrix 502 indicates a response rate of that particular user at that particular send time. In some embodiments, one or more of the fields within the user-time identification matrix 502 are empty, and the distribution time determination system 102 can impute or predict the missing matrix values via the matrix factorization model 208.

To elaborate, the distribution time determination system 102 factorizes or decomposes the user-time identification matrix 502 into a combination (e.g., a product) of two smaller matrices—e.g., a user identification matrix 504 including user identifications and a send time identification matrix 506 including send time identifications. For example, as shown in FIG. 5, the distribution time determination system 102 factorizes the user-time identification matrix R into the user identification matrix $P^T$ and the send time identification matrix Q, as given by:

$$R=P^TQ.$$

Within the user-time identification matrix 502, there are m user identifications and n send time identifications. From the user-time identification matrix 502, the distribution time determination system 102 determines an example response rate $r_{ij}$ for a user i and a send time j. Thus, for each user within the user-time identification matrix 502, the distribution time determination system 102 determines predicted response rates for send times and further ranks the send times by their respective response rates. In particular, the distribution time determination system 102 can train the matrix factorization model 208 to accurately generate predicted response rates based on solving the following optimization problem:

$$\min_{P,Q} \sum_{i,j \in R} (r_{ij} - p_i \cdot q_j)^2 + \text{regularization on } p_i \text{ and } q_j$$

where the distribution time determination system 102 utilizes the first term of the equation to minimize (or reduce) the error (the sum of squared error or "SSE") on training data (which is equivalent to minimizing the root mean square error or "RMSE" for a regression problem) and the second term to reduce overfitting. In some embodiments, the distribution time determination system 102 solves the above equation where the response rate $r_{ij}$ is the only known information. Additionally, as shown in FIG. 5, k represents the number of latent dimensions (e.g., a number of features with a feature vector), and, from FIG. 5:

$$r_{ij}=p_i^T q_j \text{ and}$$

$$?_{2,2}=p_2^T q_2.$$

Based on utilizing the matrix factorization model 208, the distribution time determination system 102 generates predicted response rates to fill in one or more of the missing values within the user-time identification matrix 502. For example, the distribution time determination system 102 implements a matrix factorization model 208 by utilizing the pyspark alternating least square ("ALS") package. Additionally, the distribution time determination system 102 tunes parameters of the matrix factorization model 208 by randomly splitting data into training and validation sets, where training is 80% of the data and validation is 20%. In some embodiments, however, the distribution time determination system 102 utilizes different ratios of training and validation data.

By minimizing RMSE on the validation set, the distribution time determination system 102 obtains parameters for ranking and regularization. The distribution time determination system 102 generates predicted response rates by send time and evaluates individual AUC on out-of-time ("OOT") data. Indeed, the distribution time determination system 102 evaluates AUC for individual send times and further determines an average AUC for the matrix factorization model 208 to evaluate the model as a whole. Additional detail regarding the results of the matrix factorization model 208 based on the OOT data is provided below with reference to FIG. 9.

Figure 6:
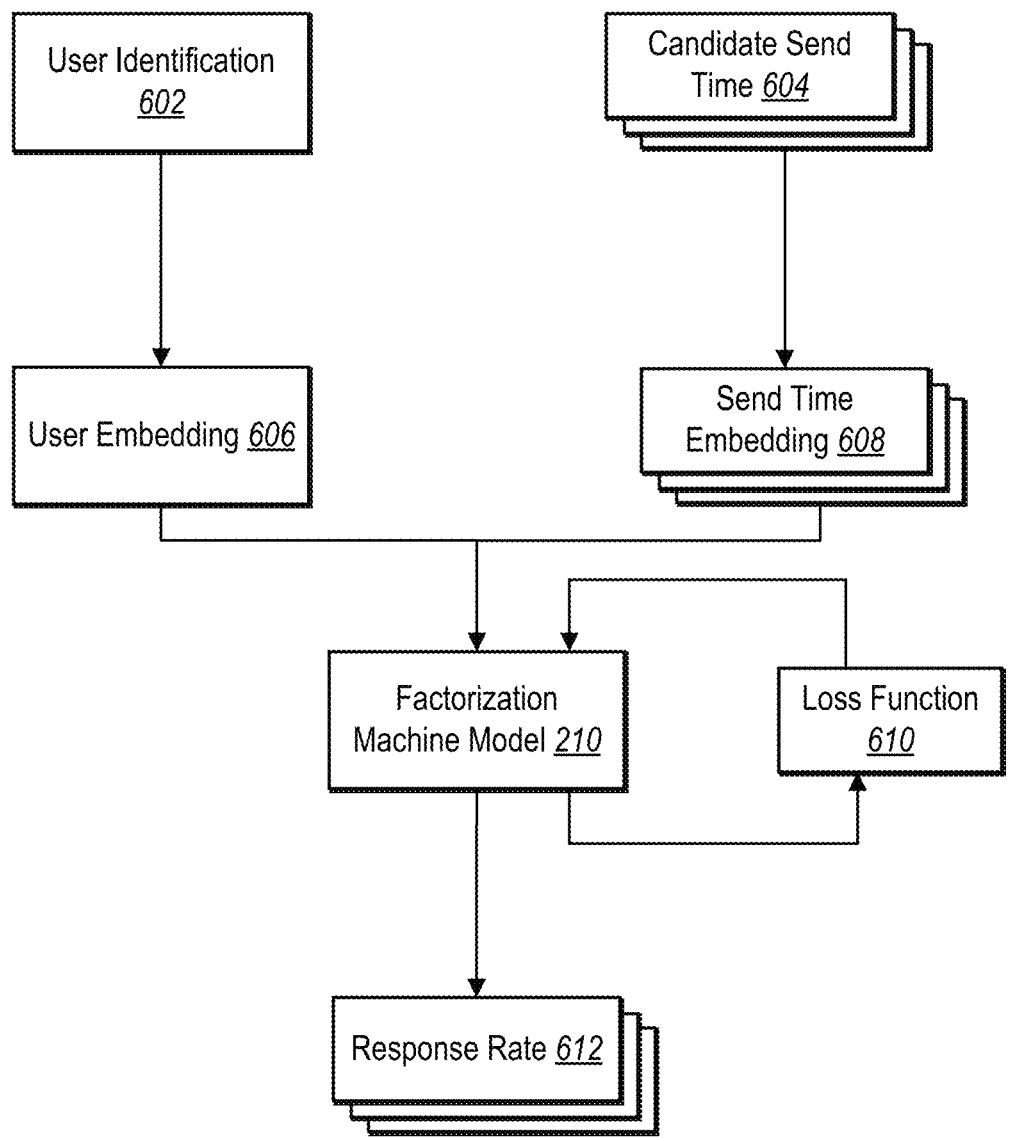
FIG. 6 illustrates an example implementation of a factorization machine model to generate a predicted response rate in accordance with one or more embodiments.

As mentioned, the distribution time determination system 102 can utilize a recommendation system model in the form of a factorization machine model to generate predicted response rates for a user by send time. For example, FIG. 6 illustrates generating a response rate 612 by utilizing a factorization machine model 210 in accordance with one or more embodiments. As illustrated in FIG. 6, the distribution time determination system 102 applies the factorization machine model 210 to generate the response rate 612 corresponding to the candidate send time 604 (and other response rates corresponding to other candidate send times) for a user corresponding to the user identification 602.

For example, the distribution time determination system 102 applies the factorization machine model 210 to determine user-time feature interactions (e.g., high-dimensional interactions between user features and send time features) by modeling the interactions in low-dimensional space. Indeed, the distribution time determination system 102 utilizes the factorization machine model 210 to learn low-dimensional embeddings of a user i and a send time j and to generate a predicted response rate 612 based on a dot product of the embeddings. For example, the distribution time determination system 102 utilizes the factorization machine model 210 to generate bounded predicted response rates (e.g., between 0 and 1 or binary predictions of 0 or 1) and to consider the uncertainty of individual elements $r_{ij}$ within a matrix, where fewer electronic communications provided at a given send time results in higher uncertainty in the $r_{ij}$ for that send time. Further, by utilizing the factorization machine model 210, the distribution time determination system 102 can incorporate additional features (in addition to user identification and send time, as is used with the matrix factorization model 208).

As shown, the distribution time determination system 102 generates a user embedding 606 based on the user identification 602 (and/or other features from a user feature record). In particular, the distribution time determination system 102 generates a latent representation of the user corresponding to the user identification 602. For example, the distribution time determination system 102 generates a vector representation (e.g., the vector representation 404) of the user including latent features that represent user information such as the user identification, the user age, the user location, the user domain, and/or historical response-related information.

In addition, the distribution time determination system 102 generates a send time embedding 608 based on the candidate send time 604. In particular, the distribution time determination system 102 generates a (latent) representation of the candidate send time 604 such as a vector that includes latent features derived from the candidate send time 604.

Based on the user embedding 606 and the send time embedding 608, the distribution time determination system 102 utilizes the factorization machine model 210 to generate the response rate 612.

In particular, the distribution time determination system 102 applies regression methods (or classification methods) to train the factorization machine model 210 based on training data including user features $f_i$ and send time features $g_i$. For the regression case, the distribution time determination system 102 includes interactions between users and send times, and solves the following optimization problem by minimizing (or reducing) the SSE:

$$\min_W \sum_{i,j \in R} (r_{ij} - f_i^T W g_j)^2$$

where $f_i$ is a u×1 vector, $g_i$ is a v×1 vector, and W is a u×v user-time feature matrix. Additionally, to accommodate for cases where individual data or features are especially sparse (e.g., where the distribution time determination system 102 is given only a single user identification 602 and a single candidate send time 604), the distribution time determination system 102 can restructure the problem as a matrix factorization problem to decompose W into two low-rank matrices P and Q, where $W \approx P^T Q$. Thus, the distribution time determination system 102 implements the factorization machine model 210 to solve:

$$\min_W \sum_{i,j \in R} (r_{ij} - f_i^T P^T Q g_j)^2$$

where the factorization machine model 210 mimics a matrix factorization model and where $Pf_i$ and $Qg_j$ are latent representations of the user i and the send time j, respectively. This formulation can help overcome overfitting issues where one or more of the vectors $f_i$ and $g_j$ are one-hot encodings and u and v are large, which results in the number of variables in W(u×v) being much larger than the number of instance (|R|) to cause overfitting.

For the above equation, if P and Q have rank k and k is small, then the dimensions of P are k×u, and the dimensions of Q are k×v. As a result, the number of variables reduces to (u+v)×k, which is much smaller than the number of variables in W(u×v). By utilizing the factorization machine model 210 to factorize the interactions between variables, the distribution time determination system 102 achieves high quality parameter estimates of higher-order interactions (and therefore accurate response rate predictions), even under sparse conditions. In one or more embodiments, the distribution time determination system 102 introduces a regularization term such as $l_2$ to the factorization machine model 210 to further prevent overfitting.

In some embodiments, the distribution time determination system 102 trains the factorization machine model 210 to generate accurate predicted response rates (e.g., the response rate 612). For example, the distribution time determination system 102 utilizes training data and a particular loss function 610 (e.g., a regression loss function such as SSE or a classification loss function such as logistic loss or hinge loss) to train the factorization machine model 210. Additionally, the distribution time determination system 102 utilizes training data including features that are one-hot encodings of the user identification 602 ($f_i$) and the candidate send time 604 ($g_t$). In some embodiments, the distribution time determination system 102 utilizes a binary classification factorization machine model 210 to generate, for the candidate send time 604 (and other candidate send times) a prediction of a binary indication of a 0 (no response) or a 1 (response).

In these or other embodiments, the distribution time determination system 102 implements the factorization machine model 210 utilizing an open source pyfm package, while in other embodiments, the distribution time determination system 102 utilizes a different architecture for the factorization machine model 210. In the same or other embodiments, the distribution time determination system 102 utilizes stochastic gradient descent with adaptive regularization as a learning method for the pyfm package factorization machine model, which adapts the regularization automatically which training the model parameters. Similar to the above discussion regarding the matrix factorization model 208, the distribution time determination system 102 tunes parameters on training data, predicts response rates based on scoring data, and evaluates the model based on OOT data.

Additionally, in some embodiments the distribution time determination system 102 utilizes additional features (e.g., from user feature records and/or historical feature records) to generate the response rate 612 utilizing the factorization machine model 210. For example, the distribution time determination system 102 adds additional user features to $f_i$ and additional send time features to $g_j$ to implement the factorization machine model 210.

In these or other embodiments, the distribution time determination system 102 handles more fields using a particular factorization machine model architecture such as field-aware factorization machines. For example, given more than two fields (e.g., to include, along with send time identification, additional features such as user age, location, and/or domain in addition or alternatively to user identification), the distribution time determination system 102 can implement a field-aware factorization machine to determine interactions between fields.

Figure 7:
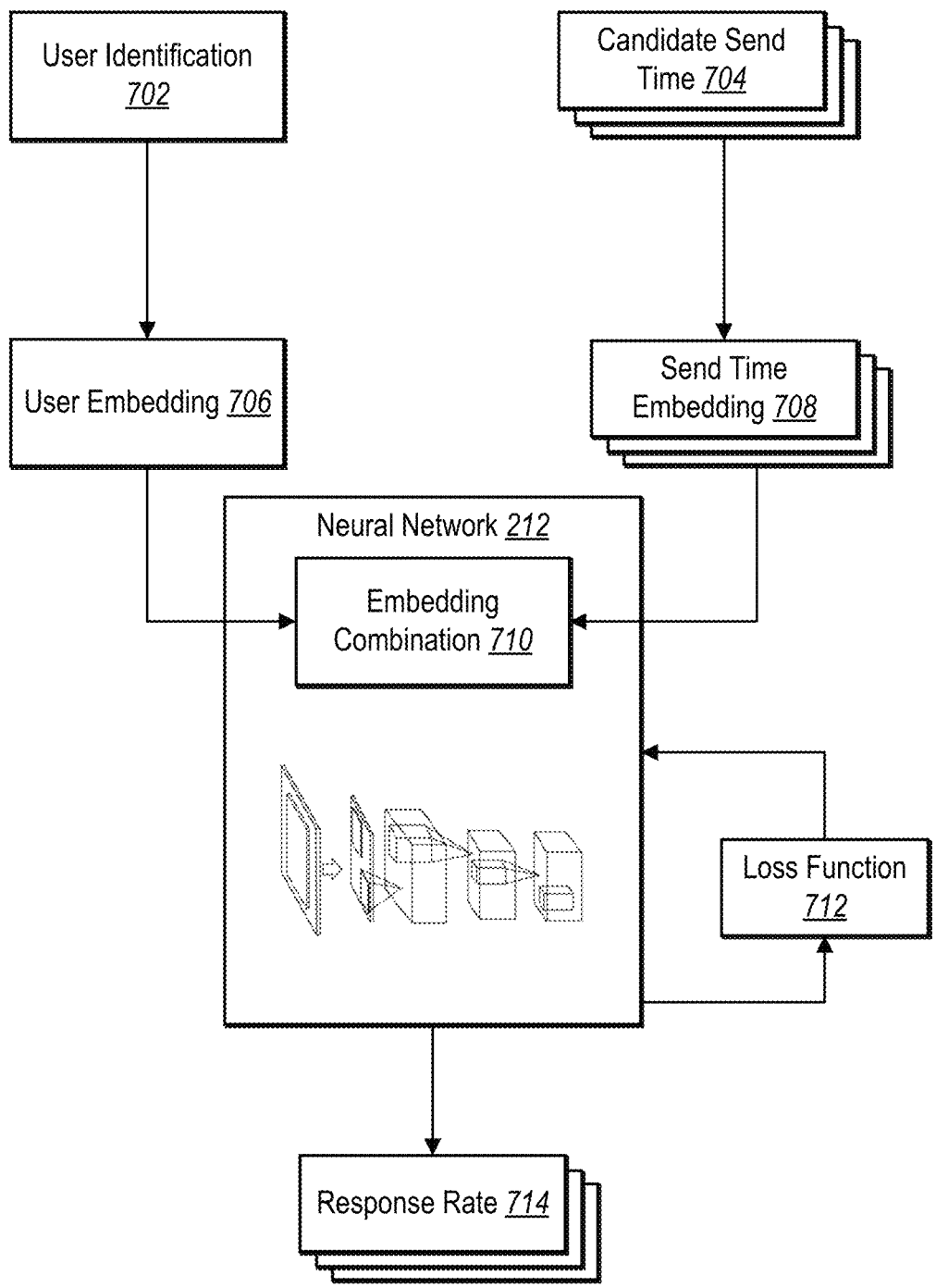
FIG. 7 illustrates an example implementation of a neural network to generate a predicted response rate in accordance with one or more embodiments.

As mentioned above, the distribution time determination system 102 can utilize a recommendation system model in the form of a neural network to generate predicted response rates by send time for a user. For example, FIG. 7 illustrates generating a response rate 714 for a user corresponding to the user identification 702 by utilizing the neural network 212 based on the user identification 702 and the candidate send time 704 in accordance with one or more embodiments. As shown, the distribution time determination system 102 utilizes the neural network 212 to generate the prediction of the response rate 714 corresponding to the candidate send time 704 (and other predicted response rates for other candidate send times). Particularly, the distribution time determination system 102 generates the response rate 714 as a binary label of a 0 (indicating a prediction that the user will not response) or a 1 (indicating a prediction that the user will respond).

As illustrated in FIG. 7, the distribution time determination system 102 generates the user embedding 706 based on the user identification 702 (and/or other features from a user feature record). In particular, the distribution time determination system 102 generates a latent representation of the user corresponding to the user identification 702. For example, the distribution time determination system 102 generates a vector representation (e.g., the vector representation 404) of the corresponding user including latent features that represent user information such as the user identification, the user age, the user location, the user domain, and/or historical response-related information.

In addition, the distribution time determination system 102 generates a send time embedding 708 based on the candidate send time 704. In particular, the distribution time determination system 102 generates a (latent) representation of the candidate send time 704 such as a vector that includes latent features derived from the candidate send time 704.

Additionally, as shown in FIG. 7, the distribution time determination system 102 combines the user embedding 706 with the send time embedding 708. In particular, the distribution time determination system 102 concatenates the user embedding with the send time embedding 708. The distribution time determination system 102 further passes the concatenated user-time embedding through user-defined layers of the neural network 212. Additionally, the distribution time determination system 102 trains the neural network 212 to generate accurate predicted response rates (e.g., the response rate 716) by utilizing a loss function 712 such as a cross entropy loss function, a logistic loss function, or a hinge loss function. For a given user (e.g., the user corresponding to the user identification 702), the distribution time determination system 102 repeats the process of combining the user embedding 706 with a send time embedding and generating a predicted response rate for each candidate send time.

By utilizing the neural network 212, the distribution time determination system 102 improves flexibility over conventional systems at least in part because the neural network 212 allows for the user embedding 706 and the send time embedding 708 to have different dimensions. Additionally, the neural network 212 brings more flexibility with the ability to learn complex, non-linear relationships. In some embodiments, the distribution time determination system 102 utilizes a particular neural network architecture, while in other embodiments the distribution time determination system 102 utilizes different neural network architectures. Further, the distribution time determination system 102 can utilize different time bucketing methods to generate candidate send times have different time granularities. Based on the candidate send times (regardless of granularity), the distribution time determination system 102 can utilize the neural network 212 to generate a predicted response rate.

Figure 8:
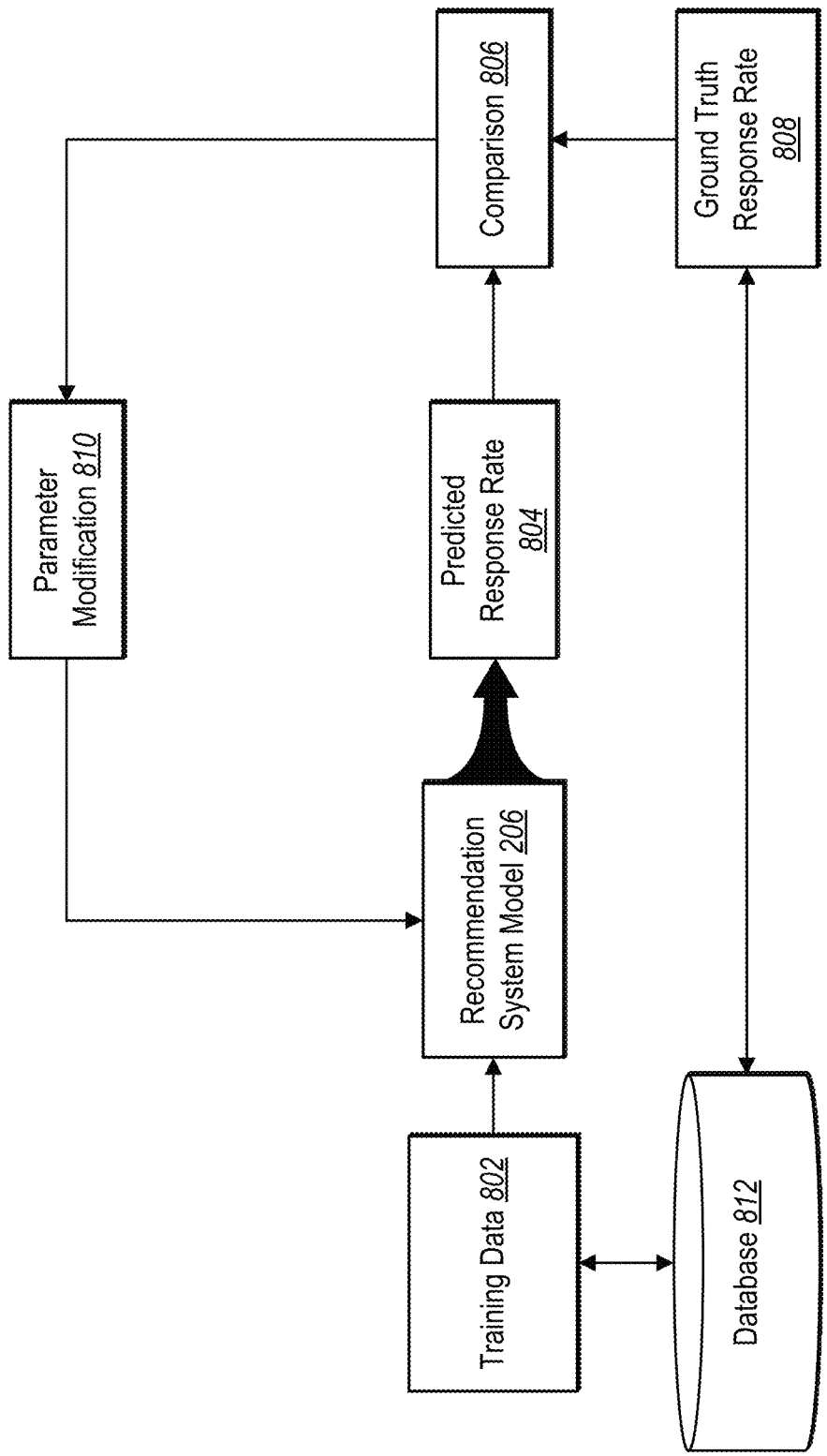
FIG. 8 illustrates training a recommendation system model in accordance with one or more embodiments.

As mentioned, the distribution time determination system 102 can train a recommendation system model (e.g., the recommendation system model 206 such as the matrix factorization model 208, the factorization machine model 210, or the neural network 212) to generate accurate predicted response rates based on training data. FIG. 8 illustrates an example process of training the recommendation system model 206 in accordance with one or more embodiments. In particular, the distribution time determination system 102 accesses training data 802 from a database 812 to input into the recommendation system model 206. For example, the training data 802 can include a user identification, an electronic communication identification, a send time identification, and a label indicating whether or not the user corresponding to the user identification responded to the electronic communication corresponding to the electronic communication identification at the send time corresponding to the send time identification.

Thus, based on an input of the training data 802, the recommendation system model 206 can generate a predicted response rate 804. Additionally, the distribution time determination system 102 performs a comparison 806 to compare the predicted response rate 804 with a ground truth response rate 808 associated with the training data 802. Indeed, the distribution time determination system 102 compares the prediction of the recommendation system model 206 with an actual result of whether or not the user corresponding the training data 802 responded to the electronic communication indicated by the training data 802 at the send time indicated by the training data 802. For example, the distribution time determination system 102 performs the comparison 806 by utilizing one or more loss functions, as mentioned above (e.g., the loss function 610 or 712), to determine an error or a measure of loss associated with the recommendation system model 206.

Based on the comparison 806 (or based on the measure of loss), the distribution time determination system 102 further performs a parameter modification 810 to modify one or more weights or parameters associated with the recommendation system model 206. Indeed, the distribution time determination system 102 modifies parameters or weights to reduce or minimize the error or measure of loss determined via the comparison 806. In some embodiments, such as embodiments where the recommendation system model 206 is a neural network, the distribution time determination system 102 performs parameter modification 810 in the form of back propagation to modify neural network weights associated with individual layers and/or neurons. In other embodiments, such as embodiments where the recommendation system model 206 is a factorization machine model, the distribution time determination system 102 performs the parameter modification 810 by adjusting parameters or weights of the factorization machine model to reduce the error or measure of loss associated with the comparison 806.

The distribution time determination system 102 further accesses new training data to input into the recommendation system model 206 to generate a new predicted response rate based on the modified parameters/weights. By repeating the process illustrated in FIG. 8 for many epochs or iterations to select training data, generate predicted response rates, compare the predictions with ground truth results, and back propagate to modify parameters, the distribution time determination system 102 trains the recommendation system model 206 by tuning the weights/parameters for accurate predictions of response rates.

As mentioned, the distribution time determination system 102 improves accuracy over conventional systems. Indeed, FIG. 9 illustrates a table of evaluation metrics determined by experimenters for the various types of recommendation system model 206 based on OOT data in accordance with one or more embodiments. In particular, experimenters evaluated the various example types of recommendation system models for the table in FIG. 9 by utilizing three months of data for training and the next two months of data for testing/evaluation. For the sample size, experimenters selected 26,014 time-sensitive users (e.g., 0.8% of original user base) to obtain 3,416,303 feature records for training and 2,360,414 feature records for testing. Based on the evaluation, the table of FIG. 9 illustrates performance metrics for the matrix factorization model 208, the factorization machine model 210, and the neural network 212. In addition, the table of FIG. 9 illustrates baseline performance metrics associated with two conventional systems—the individual response rate system and the population response rate system.

FIG. 9 illustrates AUC scores for the matrix factorization model 208, the factorization machine model 210, the neural network 212, and the two baseline systems (i.e., a mean AUC and a median AUC for each model type). As shown, the matrix factorization model 208, the factorization machine model 210, and the neural network 212 each have a higher mean AUC and median AUC than both of the baseline models. In one or more embodiments, as described above, the distribution time determination system 102 selects a recommendation system model 206 from among the matrix factorization model 208, the factorization machine model 210, and the neural network 212 based on the AUC scores (e.g., selects the model with the highest score). In other embodiments, as also described above, the distribution time determination system 102 generates composite scores by utilizing two or more of the recommendation system models 206 in combination (e.g., by average predicted response rates of the two or more models with the highest AUC scores).

Figure 10:
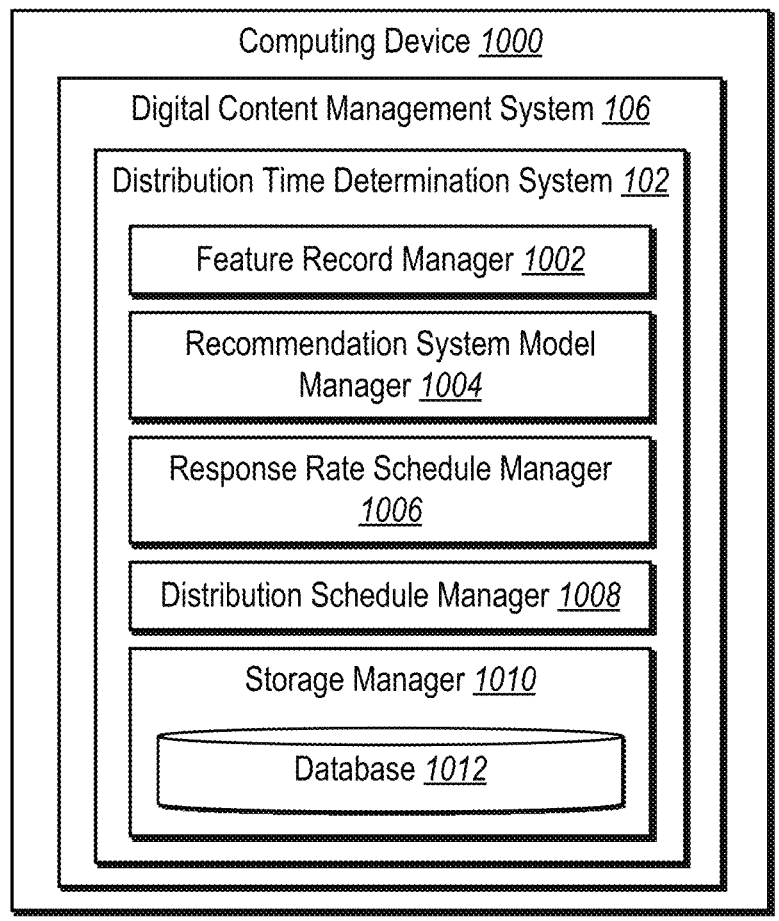
FIG. 10 illustrates a schematic diagram of a distribution time determination system in accordance with one or more embodiments.

Looking now to FIG. 10, additional detail will be provided regarding components and capabilities of the distribution time determination system 102. Specifically, FIG. 10 illustrates an example schematic diagram of the distribution time determination system 102 on an example computing device 1000 (e.g., one or more of the client devices 108a-108n, the administrator device 114, and/or the server(s) 104). As shown in FIG. 10, the distribution time determination system 102 may include a feature record manager 1002, a recommendation system model manager 1004, a response rate schedule manager 1006, a distribution schedule manager 1008, and a storage manager 1010 (which can include one or more memory devices for storing instructions for the distribution time determination system 102).

As just mentioned, the distribution time determination system 102 includes a feature record manager 1002. In particular, the feature record manager 1002 manages, maintains, stores, accesses, obtains, identifies, and/or generates feature records. For example, the feature record manager 1002 communicates with the storage manager 1010 to store and/or access user feature records and/or historical feature records within the database 1012. In one or more embodiments, the feature record manager 1002 generates user feature records and/or historical feature records to include information such as user identification, user age, user location, user domain, and/or historical response information specific to particular electronic communications and/or send times.

As shown, the distribution time determination system 102 includes a recommendation system model manager 1004. In particular, the recommendation system model manager 1004 manages, maintains, accesses, utilizes, applies, and/or implements one or more recommendation system models. For example, the recommendation system model manager 1004 utilizes one or more of the matrix factorization model 208, the factorization machine model 210, and/or the neural network 212 to generate predicted response rates by send time. In some embodiments, as described above, the recommendation system model manager 1004 trains the recommendation system model(s) as well. In these or other embodiments, the recommendation system model manager 1004 communicates with the storage manager 1010 to store predicted response rates by send time within the database 1012.

As further shown, the distribution time determination system 102 includes a response rate schedule manager 1006. In particular, the response rate schedule manager 1006 manages, maintains, determines, and/or generates response rate schedules for individual users based on predicted response rates. For example, the response rate schedule manager 1006 generates a response rate schedule for a user that includes predicted response rates for a number of candidate send times. In some embodiments, the response rate schedule manager 1006 communicates with the storage manager 1010 to access predicted response rates from, and to store the response rate schedules within, the database 1012.

Additionally, the distribution time determination system 102 includes a distribution schedule manager 1008. In particular, the distribution schedule manager 1008 manages, maintains, accesses, identifies, generates, and/or determines distribution schedules for users based on response rate schedules. For example, the distribution schedule manager 1008 generates a distribution schedule to indicate, based on the predicted response rates of a response rate schedule, at which send times to provide electronic communications to a user or client device and/or at which send times to refrain from providing electronic communications. In some embodiments, the distribution schedule manager 1008 communicates with the storage manager 1010 to access response rate schedules from, and to store distribution schedules within, the database 1012. For example, in these or other embodiments, the distribution schedule manager 1008 utilizes one or more of the processes or methods described by Lei Zhang, Jun He, Zhenyu Yan, Wuyang Dai, and Abhishek Pani in Utilizing a Genetic Algorithm in Applying Objective Functions to Determine Distribution Times for Electronic Communications, U.S. patent application Ser. No. 16/384,558 (April 2019) which is incorporated herein by reference in its entirety.

In one or more embodiments, each of the components of the distribution time determination system 102 are in communication with one another using any suitable communication technologies. Additionally, the components of the distribution time determination system 102 can be in communication with one or more other devices including one or more client devices described above. It will be recognized that although the components of the distribution time determination system 102 are shown to be separate in FIG. 10, any of the subcomponents may be combined into fewer components, such as into a single component, or divided into more components as may serve a particular implementation. Furthermore, although the components of FIG. 10 are described in connection with the distribution time determination system 102, at least some of the components for performing operations in conjunction with the distribution time determination system 102 described herein may be implemented on other devices within the environment.

The components of the distribution time determination system 102 can include software, hardware, or both. For example, the components of the distribution time determination system 102 can include one or more instructions stored on a computer-readable storage medium and executable by processors of one or more computing devices (e.g., the computing device 1000). When executed by the one or more processors, the computer-executable instructions of the distribution time determination system 102 can cause the computing device 1000 to perform the methods described herein. Alternatively, the components of the distribution time determination system 102 can comprise hardware, such as a special purpose processing device to perform a certain function or group of functions. Additionally or alternatively, the components of the distribution time determination system 102 can include a combination of computer-executable instructions and hardware.

Furthermore, the components of the distribution time determination system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the distribution time determination system 102 may be implemented as part of a stand-alone application on a personal computing device or a mobile device. Alternatively or additionally, the components of the distribution time determination system 102 may be implemented in any application that allows creation and delivery of marketing content to users, including, but not limited to, applications in ADOBE MARKETING CLOUD, such as ADOBE CAMPAIGN and ADOBE ANALYTICS. "ADOBE," "ADOBE CAMPAIGN," and "ADOBE ANALYTICS" are trademarks of Adobe Inc. in the United States and/or other countries.

FIGS. 1-10, the corresponding text, and the examples provide a number of different systems, methods, and non-transitory computer readable media for generating predicted response rates by send time based on a recommendation system approach. In addition to the foregoing, embodiments can also be described in terms of flowcharts comprising acts for accomplishing a particular result. For example, FIG. 11 illustrates a flowchart of an example sequence of acts in accordance with one or more embodiments.

Figure 11:
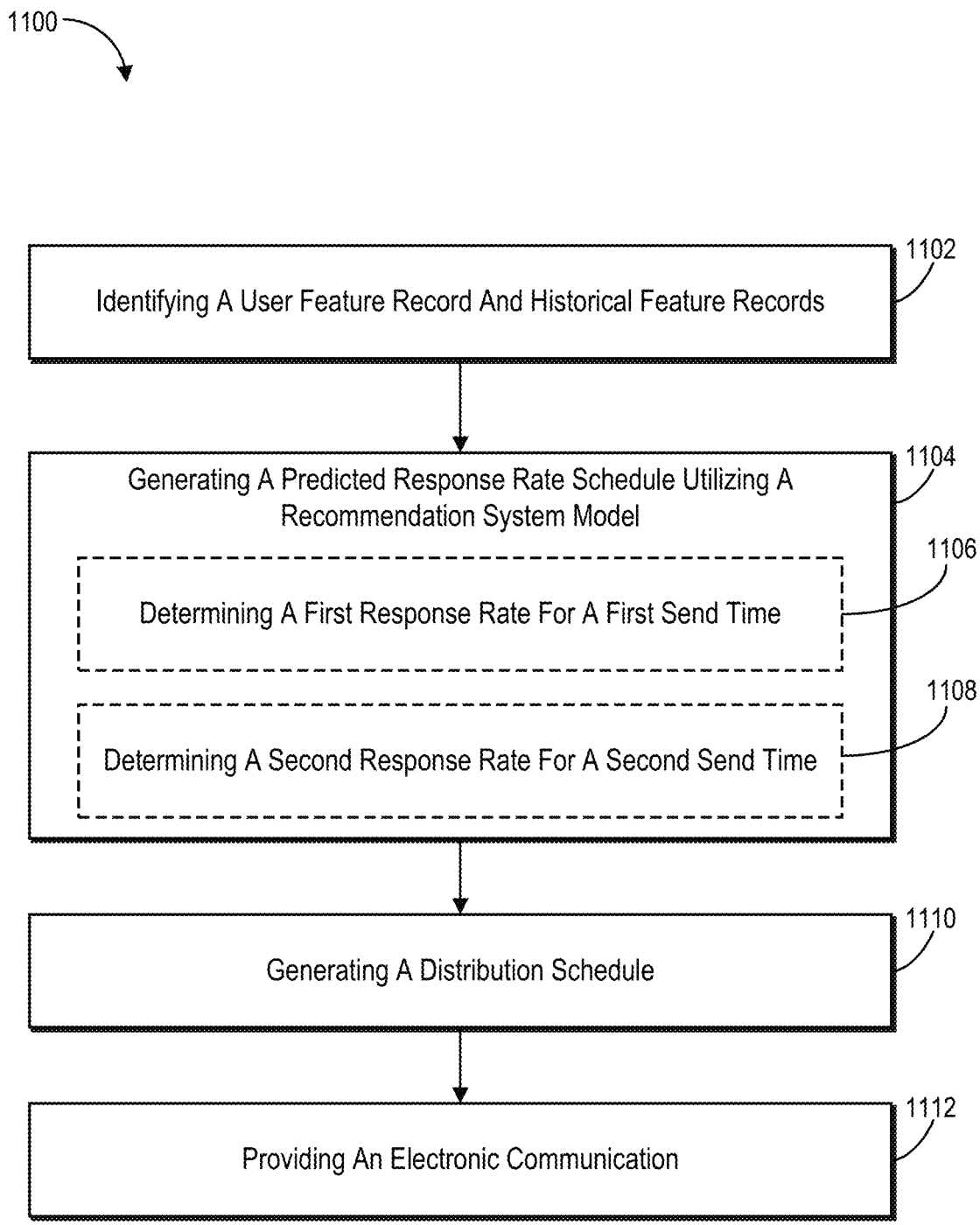
FIG. 11 illustrates a flowchart of a series of acts for generating a digital content distribution schedule utilizing a recommendation system model in accordance with one or more embodiments.

While FIG. 11 illustrates acts according to one embodiment, alternative embodiments may omit, add to, reorder, and/or modify any of the acts shown in FIG. 11. The acts of FIG. 11 can be performed as part of a method. Alternatively, a non-transitory computer readable medium can comprise instructions, that when executed by one or more processors, cause a computing device to perform the acts of FIG. 11. In still further embodiments, a system can perform the acts of FIG. 11. Additionally, the acts described herein may be repeated or performed in parallel with one another or in parallel with different instances of the same or other similar acts.

FIG. 11 illustrates an example series of acts 1100 for providing an electronic communication based on generating a predicted response rate schedule utilizing a recommendation system model. The series of acts 1100 includes an act 1102 of identifying a user feature record and historical feature records. In particular, the act 1102 can involve identifying a user feature record associated with a user and a plurality of historical feature records for a plurality of users. The user feature record can include at least two of: a user identification associated with the user, an age of the user, a location associated with the user, and a domain associated with the user. In some embodiments, the act 1102 can involve identifying, for a user, a user identification and a plurality of candidate send times for distributing electronic communications to the user. In one or more embodiments, a user feature record includes a user identification and indications of historical responses to previously distributed electronic communications.

As shown, the series of acts 1100 includes an act 1104 of generating a predicted response rate schedule utilizing a recommendation system model. In particular, the act 1104 can involve utilizing a recommendation system model to generate, based on the user feature record and the plurality of historical feature records, a predicted response rate schedule for the user. In some embodiments, the act 1104 can include generating, based on the user identification and for the plurality of candidate send times, a predicted response rate schedule for the user by utilizing one or more of the matrix factorization model, the factorization machine model, or the neural network to determine response rates corresponding to the plurality of candidate send times and selecting, based on the response rates, one or more of plurality of candidate send times to include within the predicted response rate schedule. In these or other embodiments, the act 1104 can involve determining, based on collaborative filtering of a user feature record associated with the user and a plurality of historical feature records associated with other users, the response rates corresponding to the plurality of candidate send times.

The recommendation system model can include one or more of a matrix factorization model, a factorization machine model, or a neural network. Alternatively, the recommendation system model can include one or more of a matrix factorization model or a factorization machine model. Alternatively still, the recommendation system model can include a deep convolutional neural network. The predicted response rate schedule can include one or more of a predicted click rate schedule, a predicted open rate schedule, or a predicted conversion rate schedule. The predicted response rate schedule can also (or alternatively) include a plurality of response rates associated with send times for distributing electronic communications to the user.

In some embodiments, the act 1104 can involve utilizing the one or more of the matrix factorization model, the factorization machine model, or the neural network to determine relationships between the user and the plurality of users for determining the response rates corresponding to the plurality of candidate send times. The matrix factorization model, the factorization machine model, and/or the neural network can be trained based on training data comprising electronic communication identifications for previously distributed electronic communications, user identifications for users to whom the previously distributed electronic communications were distributed, send times for the previously distributed electronic communications, response labels indicating whether or not the users responded to the previously distributed electronic communications, and response types indicating formats of responses to previously distributed electronic communications.

Additionally, the act 1104 can include an act 1106 of determining a first response rate for a first send time. In particular, the act 1106 can involve determining, based on collaborative filtering of the user feature record and the plurality of historical feature records, a first response rate for a first candidate send time. Further, the act 1104 can include an act 1108 of determining a second response rate for a second send time. In particular, the act 1108 can involve determining, based on collaborative filtering of the user feature record and the plurality of historical feature records, a second response rate for a second candidate send time. For example, the acts 1106 and 1108 can involve utilizing a matrix factorization model to generate the predicted response rate schedule. Indeed, the acts 1106 and 1108 can involve generating a user-time identification matrix comprising user identifications for the plurality of users, a first candidate send time identification for the first candidate send time, and a second candidate send time identification for the second candidate send time. The acts 1106 and 1108 can also involve decomposing the user-time identification matrix into a user identification matrix including the user identifications and a send time identification matrix including the first send time identification and the second send time identification. Further, the acts 1106 and 1108 can involve determining the first response rate for the first candidate send time and the second response rate for the second candidate send time based on respective combinations of a user identification matrix value and a send time identification matrix value.

Additionally (or alternatively), the acts 1106 and 1108 can involve utilizing the matrix factorization model to generate the predicted response rate schedule by generating a user-time identification matrix comprising user identifications for the plurality of users, a first candidate send time identification for the first candidate send time, and a second candidate send time identification for the second candidate send time, decomposing the user-time identification matrix into a user identification matrix comprising the user identifications and a send time identification matrix comprising the first send time identification and the second send time identification, and determining the first response rate for the first candidate send time and the second response rate for the second candidate send time based on respective combinations of a user identification matrix value and a send time identification matrix value.

In some embodiments, the acts 1106 and 1108 can involve utilizing the factorization machine model to generate the predicted response rate schedule. For example, in these embodiments, the acts 1106 and 1108 can involve determining user feature vectors associated with the plurality of users, a first send time feature vector associated with the first candidate send time, and a second send time feature vector associated with the second candidate send time, determining user-time feature interactions based on the user feature vectors, the first send time feature vector, and the second send time feature vector, and determining, based on the user-time feature interactions, a first binary prediction of whether or not the user will respond at the first candidate send time and a second binary prediction of whether or not the user will respond at the second candidate time.

Additionally (or alternatively), the acts 1106 and 1108 can involve utilizing the neural network to generate the predicted response rate schedule by determining a user embedding for the user, a first send time embedding for the first candidate send time, and a second time embedding for the second candidate send time, generating a combination of the user embedding with one or more of the first send time embedding or the second send time embedding, and applying, based on the combination, the neural network to generate the first response rate for the first candidate send time and second response rate for the second candidate send time.

As illustrated in FIG. 11, the series of acts 1100 includes an act 1110 of generating a distribution schedule. In particular, the act 1110 can involve generating, based on the predicted response rate schedule, a distribution schedule for providing electronic communications to the user. For example, the act 1110 can involve utilizing an upper-confidence-bound modification to generate the distribution schedule.

Further, the series of acts 1100 includes an act 1112 of providing an electronic communication. In particular, the act 1112 can involve providing an electronic communication to the user based on the distribution schedule. The series of acts 1100 can also include an act of determining a time granularity for bucketing candidate send times.

In one or more embodiments, the distribution time determination system 102 can perform a step for predicting a response rate schedule for the user utilizing a recommendation system model based on the user feature record. For example, the acts and algorithms described above in relation to FIGS. 2-7 can provide the corresponding acts and algorithms (e.g., structure) for a step for predicting a response rate schedule for the user utilizing a recommendation system model based on the user feature record. Additionally (or alternatively), FIG. 12 illustrates an example series of acts 1204-1212 within the dashed box 1203 that can provide the structure for a step for predicting a response rate schedule for the user utilizing a recommendation system model based on the user feature record in accordance with one or more embodiments.

Figure 12:
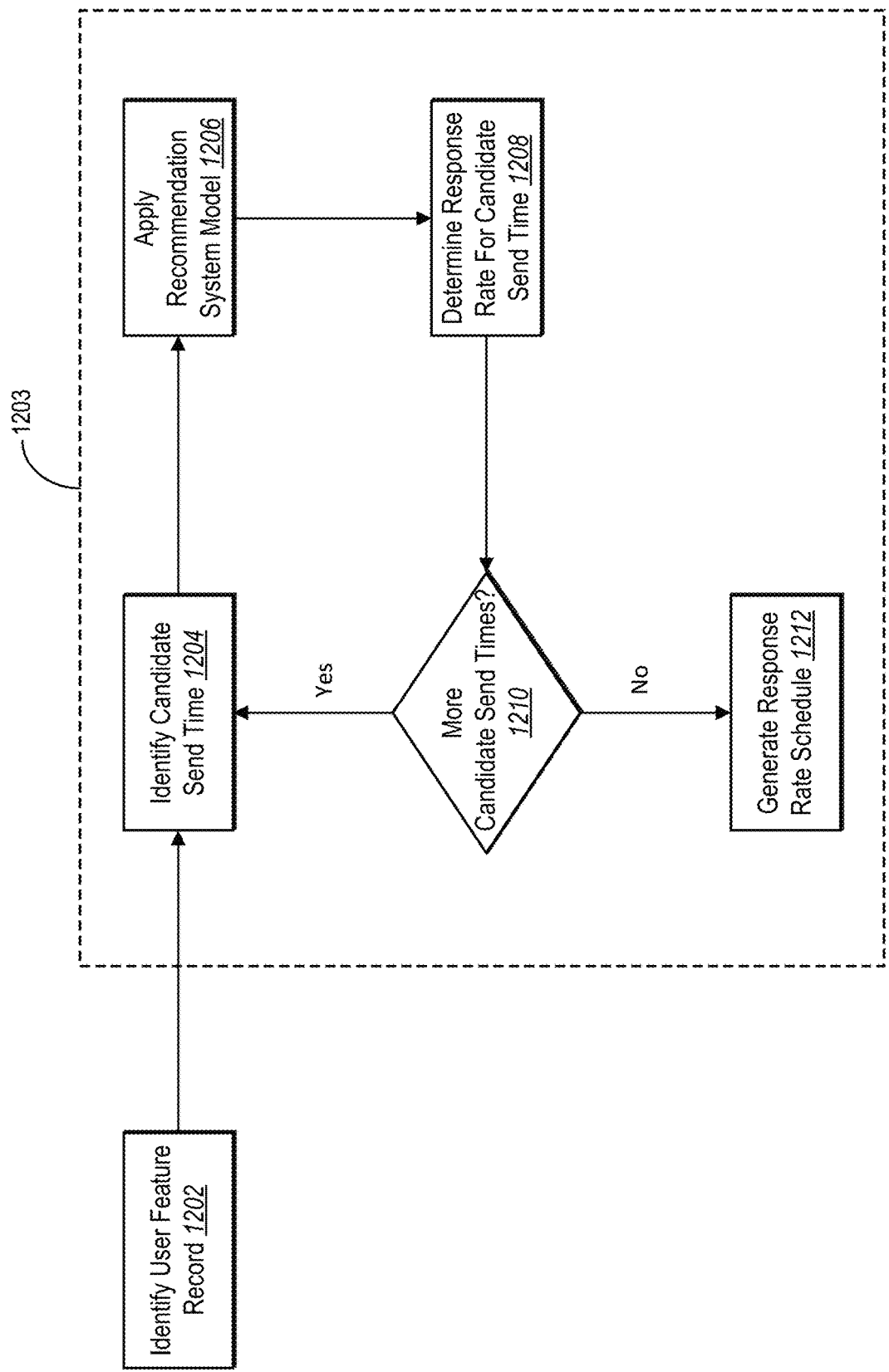
FIG. 12 illustrates a series of acts for a step for predicting a response rate schedule for the user utilizing a recommendation system model based on the user feature record in accordance with one or more embodiments.

As shown in FIG. 12, the distribution time determination system 102 performs an act 1202 to identify a use feature record associated with a particular user. Additionally, for the particular user, the distribution time determination system 102 performs an act 1204 to identify a candidate send time. In particular, the distribution time determination system 102 identifies a candidate send time from among a number of candidate send times. As described above, the distribution time determination system 102 can determine the candidate send time based on determining a time granularity over a given time horizon.

Further, the distribution time determination system 102 performs an act 1206 to apply a recommendation system model. In particular, as described above, the distribution time determination system 102 applies a recommendation system model such as the matrix factorization model 208, the factorization machine model 210, and/or the neural network 212. Thus, based on applying the recommendation system model, the distribution time determination system 102 performs an act 1208 to determine a response rate for the candidate send time. Indeed, as detailed above, the distribution time determination system 102 generates a predicted response rate for the candidate send time based on the output of the recommendation system model (e.g., the recommendation system model 206).

As illustrated in FIG. 12, the distribution time determination system 102 also performs an act 1210 to determine whether or not there are more candidate send times. For example, over a given time horizon, the distribution time determination system 102 determines whether there are additional candidate send times for which the distribution time determination system 102 has not yet generated a predicted response rate for the user. Upon determining that there are additional candidate send time(s), the distribution time determination system 102 repeats the acts 1204-1210 until the distribution time determination system 102 generates a predicted response rate for each of the candidate send times over the particular time horizon. Based on the predicted response rates for each of the candidate send times, the distribution time determination system 102 further performs an act 1212 to generate a response rate schedule for the user, which includes predicted response rates for each of the send times over the particular time horizon (and at the particular time granularity).

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 13:
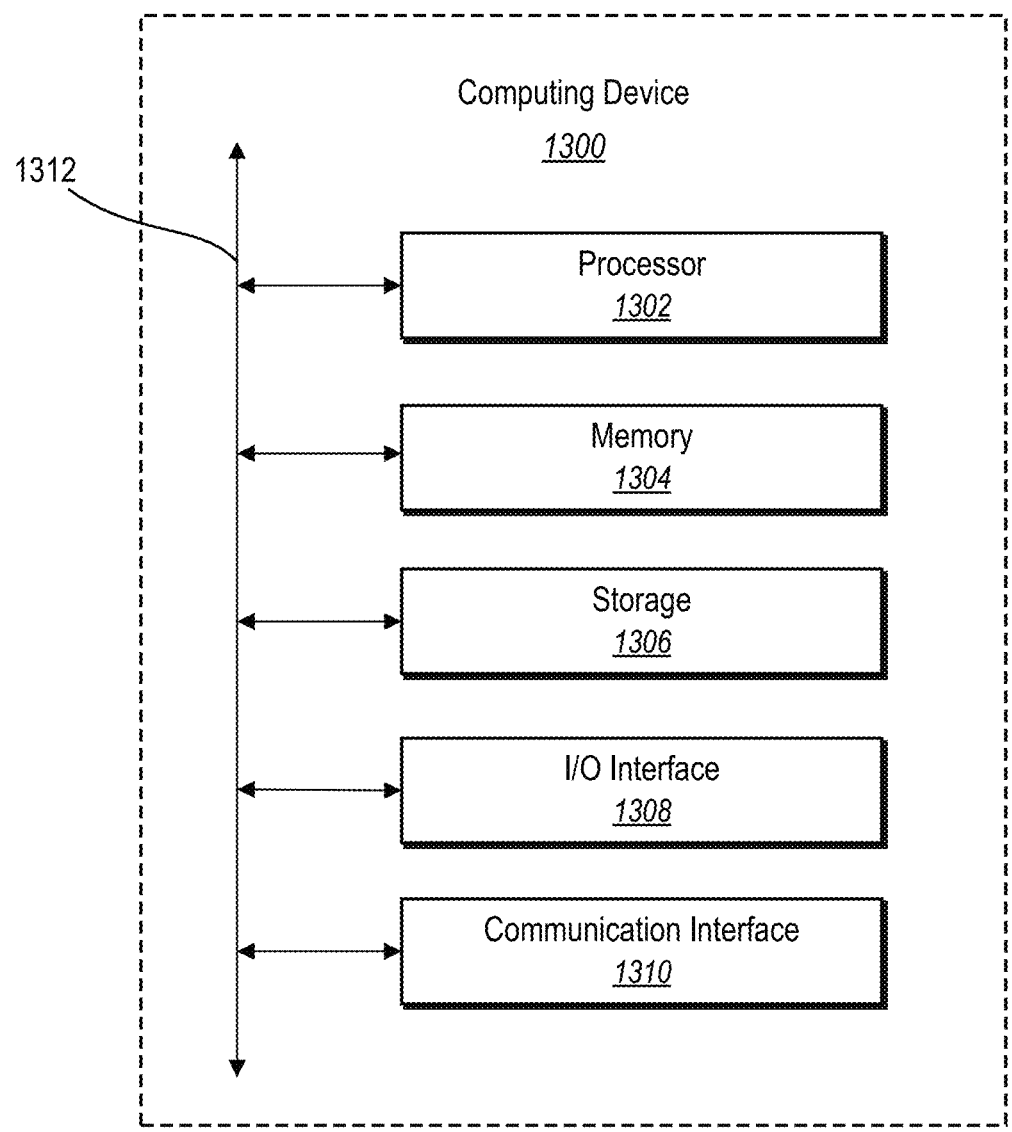
FIG. 13 illustrates a block diagram of an example computing device in accordance with one or more embodiments.

FIG. 13 illustrates, in block diagram form, an example computing device 1300 (e.g., the computing device 1000, the client devices 108a-108n, the administrator device 114, and/or the server(s) 104) that may be configured to perform one or more of the processes described above. One will appreciate that the distribution time determination system 102 can comprise implementations of the computing device 1300. As shown by FIG. 13, the computing device can comprise a processor 1302, memory 1304, a storage device 1306, an I/O interface 1308, and a communication interface 1310. Furthermore, the computing device 1300 can include an input device such as a touchscreen, mouse, keyboard, etc. In certain embodiments, the computing device 1300 can include fewer or more components than those shown in FIG. 13. Components of computing device 1300 shown in FIG. 13 will now be described in additional detail.

In particular embodiments, processor(s) 1302 includes hardware for executing instructions, such as those making up a computer program. As an example, and not by way of limitation, to execute instructions, processor(s) 1302 may retrieve (or fetch) the instructions from an internal register, an internal cache, memory 1304, or a storage device 1306 and decode and execute them.

The computing device 1300 includes memory 1304, which is coupled to the processor(s) 1302. The memory 1304 may be used for storing data, metadata, and programs for execution by the processor(s). The memory 1304 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1304 may be internal or distributed memory.

The computing device 1300 includes a storage device 1306 includes storage for storing data or instructions. As an example, and not by way of limitation, storage device 1306 can comprise a non-transitory storage medium described above. The storage device 1306 may include a hard disk drive (HDD), flash memory, a Universal Serial Bus (USB) drive or a combination of these or other storage devices.

The computing device 1300 also includes one or more input or output ("I/O") devices/interfaces 1308, which are provided to allow a user to provide input to (such as user strokes), receive output from, and otherwise transfer data to and from the computing device 1300. These I/O devices/interfaces 1308 may include a mouse, keypad or a keyboard, a touch screen, camera, optical scanner, network interface, modem, other known I/O devices or a combination of such I/O devices/interfaces 1308. The touch screen may be activated with a writing device or a finger.

The I/O devices/interfaces 1308 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1308 is configured to provide graphical data to a display for presentation to a user. The graphical data may be representative of one or more graphical user interfaces and/or any other graphical content as may serve a particular implementation.

The computing device 1300 can further include a communication interface 1310. The communication interface 1310 can include hardware, software, or both. The communication interface 1310 can provide one or more interfaces for communication (such as, for example, packet-based communication) between the computing device and one or more other computing devices 1300 or one or more networks. As an example, and not by way of limitation, communication interface 1310 may include a network interface controller (NIC) or network adapter for communicating with an Ethernet or other wire-based network or a wireless NIC (WNIC) or wireless adapter for communicating with a wireless network, such as a WI-FI. The computing device 1300 can further include a bus 1312. The bus 1312 can comprise hardware, software, or both that couples components of computing device 1300 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method of determining electronic message send times for individual recipient devices using a recommendation system approach, the computer-implemented method comprising:
identifying a user feature record associated with a user and a plurality of historical feature records for a plurality of users;
utilizing a factorization machine model to generate, based on the user feature record and the plurality of historical feature records, a predicted response rate schedule for the user by:
determining user feature vectors associated with the plurality of users, a first send time feature vector associated with a first candidate send time, and a second send time feature vector associated with a second candidate send time;
determining user-time feature interactions based on the user feature vectors, the first send time feature vector, and the second send time feature vector; and
determining, based on the user-time feature interactions, a first binary prediction of whether or not the user will respond at the first candidate send time and a second binary prediction of whether or not the user will respond at the second candidate send time;
generating, based on the predicted response rate schedule, a distribution schedule for providing electronic communications to the user; and
providing an electronic communication to the user based on the distribution schedule.

2. The computer-implemented method of claim 1, further comprising determining a time granularity for bucketing candidate send times.

3. The computer-implemented method of claim 1, wherein the user feature record comprises at least two of: a user identification associated with the user, an age of the user, a location associated with the user, and a domain associated with the user.

4. The computer-implemented method of claim 1, wherein the predicted response rate schedule comprises one or more of a predicted click rate schedule, a predicted open rate schedule, or a predicted conversion rate schedule.

5. The computer-implemented method of claim 1, wherein the predicted response rate schedule comprises a plurality of response rates associated with send times for distributing electronic communications to the user.

6. A non-transitory computer readable medium comprising instructions that, when executed by at least one processor, cause a computer device to:
identify a user feature record associated with a user and a plurality of historical feature records for a plurality of users;
utilize a matrix factorization model to generate, based on the user feature record and the plurality of historical feature records, a predicted response rate schedule for the user by:
generating a user-time identification matrix comprising user identifications for the plurality of users, a first candidate send time identification for a first candidate send time, and a second candidate send time identification for a second candidate send time;
decomposing the user-time identification matrix into a user identification matrix comprising the user identifications and a send time identification matrix comprising the first send time identification and the second send time identification; and
determining a first response rate for the first candidate send time and a second response rate for the second candidate send time based on respective combinations of a user identification matrix value and a send time identification matrix value;
generate, based on the predicted response rate schedule, a distribution schedule for providing electronic communications to the user; and
provide an electronic communication to the user based on the distribution schedule.

7. The non-transitory computer readable medium of claim 6, further comprising instructions that, when executed by the at least one processor, cause the computing device to generate the predicted response rate schedule by further determining additional predicted response rates by send time that indicate probabilities that the user will respond to electronic communications distributed at respective send times.

8. The non-transitory computer readable medium of claim 6, wherein the user-time identification matrix indicates cross-sections of the user identifications for the plurality of users and corresponding send time identifications for candidate send times.

9. The non-transitory computer readable medium of claim 6, further comprising instructions that, when executed by the at least one processor, cause the computer device to rank the first candidate send time and the second candidate send time on a user-by-user basis for the user and for other users utilizing an area under a curve evaluation metric.

10. The non-transitory computer readable medium of claim 6, further comprising instructions that, when executed by the at least one processor, cause the computer device to determine measures of likelihood that the user will respond at the first candidate send time and the second candidate send time utilizing an area under a curve evaluation metric.

11. The non-transitory computer readable medium of claim 6, wherein the predicted response rate schedule comprises one or more of a predicted click rate schedule, a predicted open rate schedule, or a predicted conversion rate schedule.

12. The non-transitory computer readable medium of claim 6, wherein the user feature record comprises at least two of: a user identification associated with the user, an age of the user, a location associated with the user, and a domain associated with the user.

13. The non-transitory computer readable medium of claim 6, further comprising instructions that, when executed by the at least one processor, cause the computer device to determine a time granularity for bucketing candidate send times.

14. A system comprising:
one or more memory devices comprising a neural network; and
one or more server devices that cause the system to:
identify, for a user, a user identification, a user feature record, and a plurality of candidate send times for distributing electronic communications to the user;
utilize a neural network to generate, for the plurality of candidate send times, a predicted response rate schedule for the user corresponding to the user identification by:
determining a user embedding for the user, a first send time embedding for a first candidate send time, and a second time embedding for a second candidate send time;

generating a combination of the user embedding with one or more of the first send time embedding or the second send time embedding; and applying, based on the combination, the neural network to generate a first response rate for the first candidate send time and a second response rate for the second candidate send time;

generate, based on the predicted response rate schedule, a distribution schedule for providing electronic communications to the user; and provide an electronic communication to the user based on the distribution schedule.

15. The system of claim 14, wherein the one or more server devices further cause the system to determine the response rates via collaborative filtering by determining relationships in a latent space between latent representations of the user feature record and historical feature records associated with the other users.

16. The system of claim 14, wherein the one or more server devices further cause the system to identify a plurality of user feature records for a plurality of users, wherein a user feature record comprises a user identification and indications of historical responses to previously distributed electronic communications.

17. The system of claim 16, wherein the one or more server devices further cause the system to generate the predicted response rate schedule for the user by utilizing the neural network to determine relationships between the user and the plurality of users for determining the response rates corresponding to the plurality of candidate send times.

18. The system of claim 14, wherein the neural network comprises parameters learned from training data comprising electronic communication identifications for previously distributed electronic communications, user identifications for users to whom the previously distributed electronic communications were distributed, send times for the previously distributed electronic communications, response labels indicating whether or not the users responded to the previously distributed electronic communications, and response types indicating formats of responses to previously distributed electronic communications.

19. The system of claim 14, wherein the one or more server devices cause the system to generate the distribution schedule by utilizing an upper-confidence-bound modification.

20. The system of claim 14, wherein the predicted response rate schedule comprises one or more of a predicted click rate schedule, a predicted open rate schedule, or a predicted conversion rate schedule.

* * * * *